US011505406B2

(12) United States Patent
Aljallis et al.

(10) Patent No.: US 11,505,406 B2
(45) Date of Patent: Nov. 22, 2022

(54) SYSTEMS AND METHODS FOR TRANSPORTING CONTAINERS WITH A VEHICLE

(71) Applicant: Walmart Apollo, LLC, Bentonville, AR (US)

(72) Inventors: Elias Aljallis, Howard Beach, NY (US); Vikranth Gopalakrishnan, North Brunswick, NJ (US); Ronald S. Kyslinger, York, PA (US)

(73) Assignee: Walmart Apollo, LLC, Bentonville, AR (US)

( * ) Notice: Subject to any disclaimer, the term of this patent is extended or adjusted under 35 U.S.C. 154(b) by 753 days.

(21) Appl. No.: 16/448,835

(22) Filed: Jun. 21, 2019

(65) Prior Publication Data

US 2020/0004252 A1    Jan. 2, 2020

Related U.S. Application Data

(60) Provisional application No. 62/692,544, filed on Jun. 29, 2018, provisional application No. 62/692,550, (Continued)

(51) Int. Cl.
| | |
|---|---|
| *G06F 7/00* | (2006.01) |
| *B65G 1/06* | (2006.01) |
| *B60P 3/00* | (2006.01) |
| *B65G 1/04* | (2006.01) |
| *G05D 1/02* | (2020.01) |
| *B65G 47/90* | (2006.01) |
| *B65B 5/10* | (2006.01) |
| *B65B 43/56* | (2006.01) |

(Continued)

(52) U.S. Cl.
CPC .............. *B65G 1/06* (2013.01); *B25J 5/04* (2013.01); *B60P 3/007* (2013.01); *B61B 3/00* (2013.01); *B61B 10/02* (2013.01); *B65B 5/10* (2013.01); *B65B 43/56* (2013.01); *B65G 1/0457* (2013.01); *B65G 1/0492* (2013.01); *B65G 47/90* (2013.01); *B65G 65/00* (2013.01); *G05D 1/0212* (2013.01); *B65G 1/1373* (2013.01); *G05D 2201/0216* (2013.01)

(58) Field of Classification Search
USPC ................. 700/213–214, 216, 228; 701/23
See application file for complete search history.

(56) References Cited

U.S. PATENT DOCUMENTS 4,851,018 A * 7/1989 Lazzari ................. F24F 3/167
414/217
2016/0214797 A1* 7/2016 Pankratov ............ G06Q 10/087

(Continued)

*Primary Examiner* — Yolanda R Cumbess
(74) *Attorney, Agent, or Firm* — Morgan, Lewis & Bockius LLP; Manita Rawat

(57) ABSTRACT

Among other things, a vehicle for transporting containers is disclosed. The vehicle can include a base, a rack, and at least one container. The base can include a platform, wheels, and a motor for driving one or more of the wheels. The rack can be mounted to the platform. The rack can include at least one rail. The at least one rail can include a channel defined therein and an end coupling for linking the at least one rail with an external rail. The at least one container can be configured to connect with the at least one rail and include a connection assembly. At least a portion of the connection assembly can be moveably disposed in the channel.

20 Claims, 31 Drawing Sheets

Related U.S. Application Data filed on Jun. 29, 2018, provisional application No. 62/692,606, filed on Jun. 29, 2018, provisional application No. 62/692,522, filed on Jun. 29, 2018.

(51) Int. Cl.
| | | |
|---|---|---|
| *B65G 65/00* | (2006.01) | |
| *B25J 5/04* | (2006.01) | |
| *B61B 3/00* | (2006.01) | |
| *B61B 10/02* | (2006.01) | |
| *B65G 1/137* | (2006.01) | |

(56) References Cited

U.S. PATENT DOCUMENTS

2017/0166356 A1* 6/2017 Tubilla Kuri .......... B25J 9/1679
2018/0127212 A1* 5/2018 Jarvis ..................... B60P 1/02

* cited by examiner

SYSTEMS AND METHODS FOR TRANSPORTING CONTAINERS WITH A VEHICLE

CROSS-REFERENCE

This application claims priority to U.S. Provisional Patent Application No. 62/692,522 entitled "Container Filling," U.S. Provisional Patent Application No. 62/692,544 entitled "Container Quick-Release," U.S. Provisional Patent Application No. 62/692,550 entitled "Robotic Container Connection," U.S. Provisional Patent Application No. 62/692,606 entitled "Container Transportation," each filed Jun. 29, 2018 and each of which are hereby incorporated by reference in their entireties.

TECHNICAL FIELD

Among other things, the present application relates to automated transportation of containers. The transportation can be accomplished with vehicles or other robotic systems.

BACKGROUND

Warehouses can store many different kinds of items in bins (i.e., longer term storage containers). When a customer places a remote order (e.g., an online order), an employee can load the ordered items from the bins into pockets (i.e., shorter term storage containers). The pockets can be moveably suspended from a rail system. Motors in the rail system can slide (e.g., roll) the pockets along tracks from a loading station to a packing station.

When a pocket arrives at a packing station, an employee can manually remove the pocket and/or the item stored therein. The employee can place the item in a box (e.g., a shipping container). The process can be repeated until the box contains the customer's complete order. The employee can mark the packed box for shipment. A customer's order can include many different items and a warehouse can receive many different simultaneous orders. As a result, the rail system may incorporate thousands of pockets. When pockets are transferred to various locations in the warehouse, an employee may need to manually move the pockets and/or manually remove the pockets from the rail system to another system. Such manual removal can be time-consuming.

SUMMARY

According to some embodiments, a vehicle can include a base, a rack, and at least one container. The base can include a platform, wheels, and a motor for driving one or more of the wheels. The rack can be mounted to the platform. The rack can include at least one rail. The at least one rail can include a channel defined therein and an end coupling for linking the at least one rail with an external rail. The at least one container can be configured to connect with the at least one rail and include a connection assembly. At least a portion of the connection assembly can be moveably disposed in the channel.

The vehicle can include a processing system. The processing system can include one or more processors configured to: receive a request to link the at least one rail with the external rail; drive the motor to align the end coupling with the external rail; and based on determining that the end coupling is aligned with the external rail, drive the motor to link the end coupling with the external rail such that the at least one container is moveable, along the channel, from the at least one rail to the external rail.

BRIEF DESCRIPTION OF THE FIGURES

The Figures show some of the illustrative embodiments disclosed herein. As further explained below, the claimed inventions are not limited to the illustrative embodiments and therefore are not limited to the embodiments shown in the Figures.

For clarity and ease of reading, some Figures omit views of certain features. The relative dimensions shown in the Figures can be aspects of a few illustrative embodiments. Therefore, relative dimensions shown in the Figures can serve as original support. Other illustrative embodiments lack any dimensional relationship to the Figures. The claimed inventions are not limited to any absolute or relative dimensions shown in the Figures unless explicitly stated otherwise.

The present disclosure generally uses the terms "longitudinal", "transverse", and "vertical" to give the reader context when viewing the Figures. Referring to the Figures, depth along the X-axis can be "transverse", depth along the Y-axis can be "longitudinal", and depth along the Z-axis can be "vertical". The X, Y, and Z-axes are consistent across the Figures. Except in FIG. 4, hatching (i.e., stippling) indicates inner material.

Figure 1:
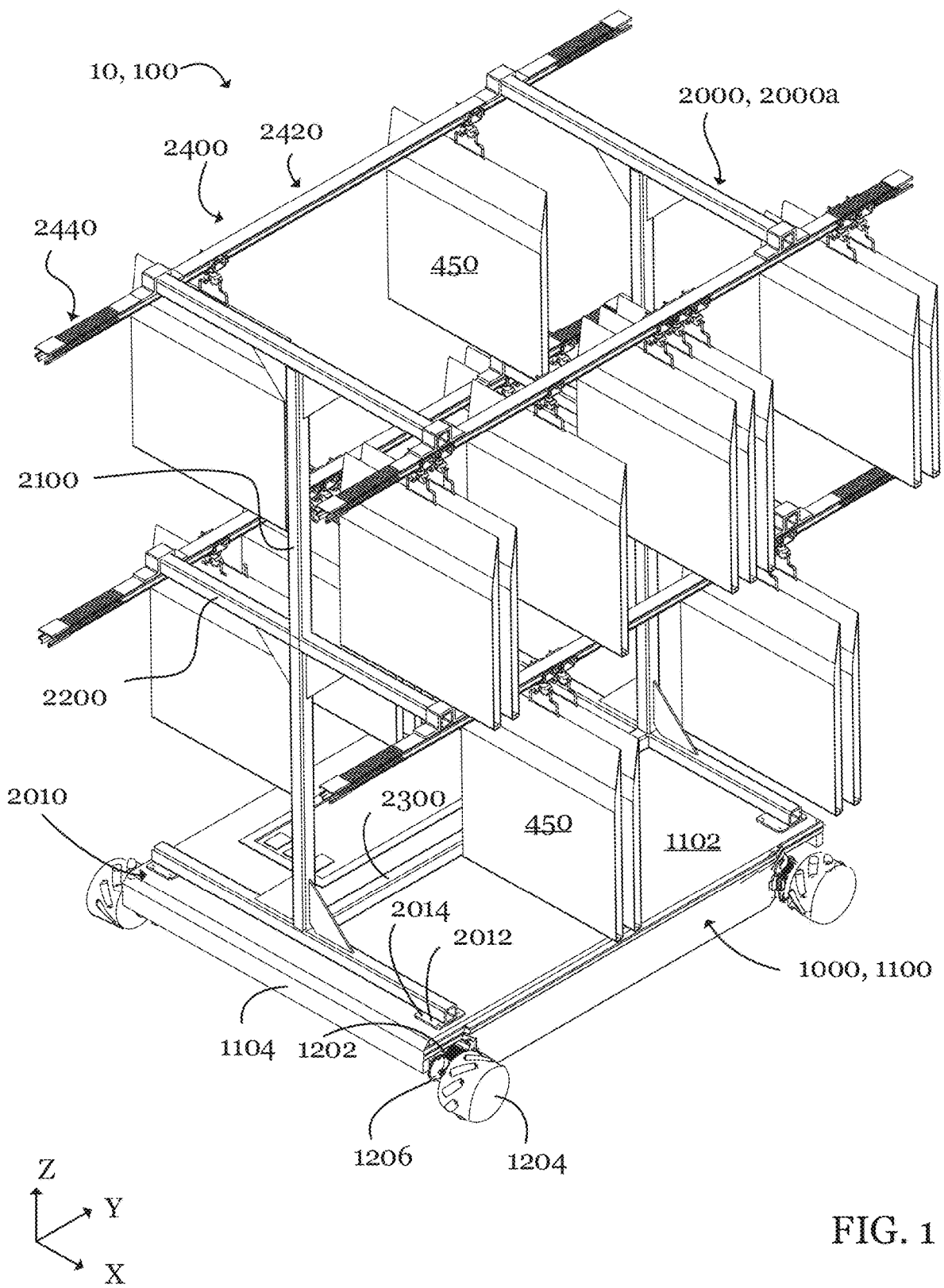

FIG. 1 is an isometric view of a vehicle, which is sporadically populated with containers, in accordance with some embodiments.

Figure 2:
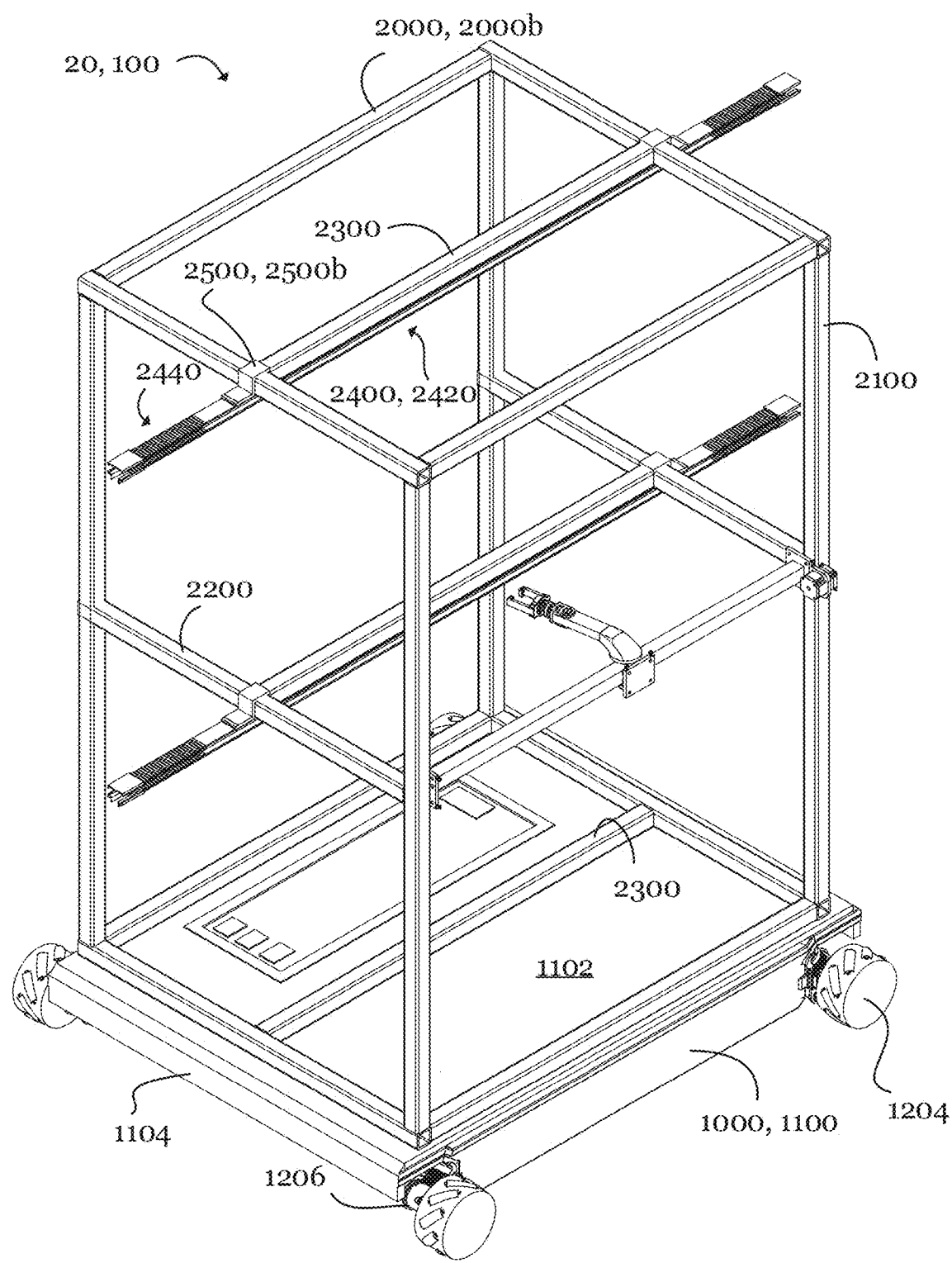

FIG. 2 is an isometric view of an alternative vehicle, which is unpopulated with containers, in accordance with some embodiments.

Figure 3:
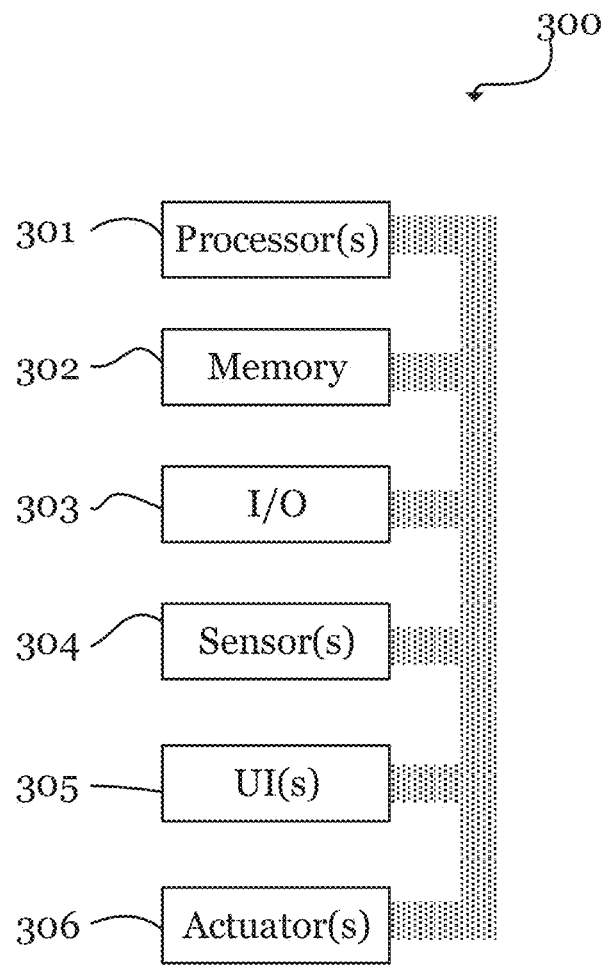

FIG. 3 is a block diagram of a processing system, which can be incorporated in the vehicles shown in FIGS. 1 and 2, in accordance with some embodiments.

Figure 4:
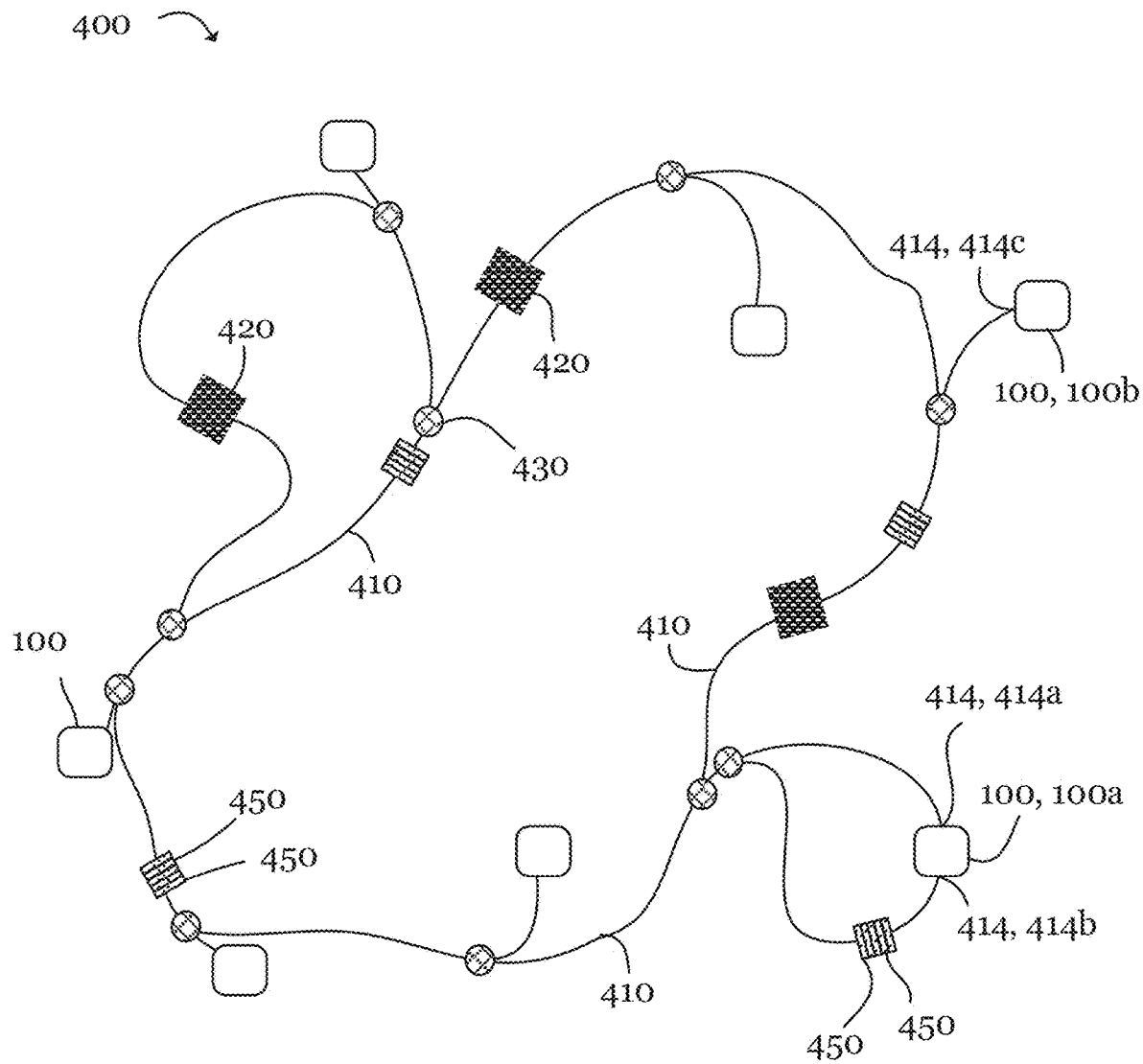

FIG. 4 is a schematic top plan view of a rail system to which the vehicles in FIGS. 1 and/or 2 can couple, in accordance with some embodiments.

Figure 5:
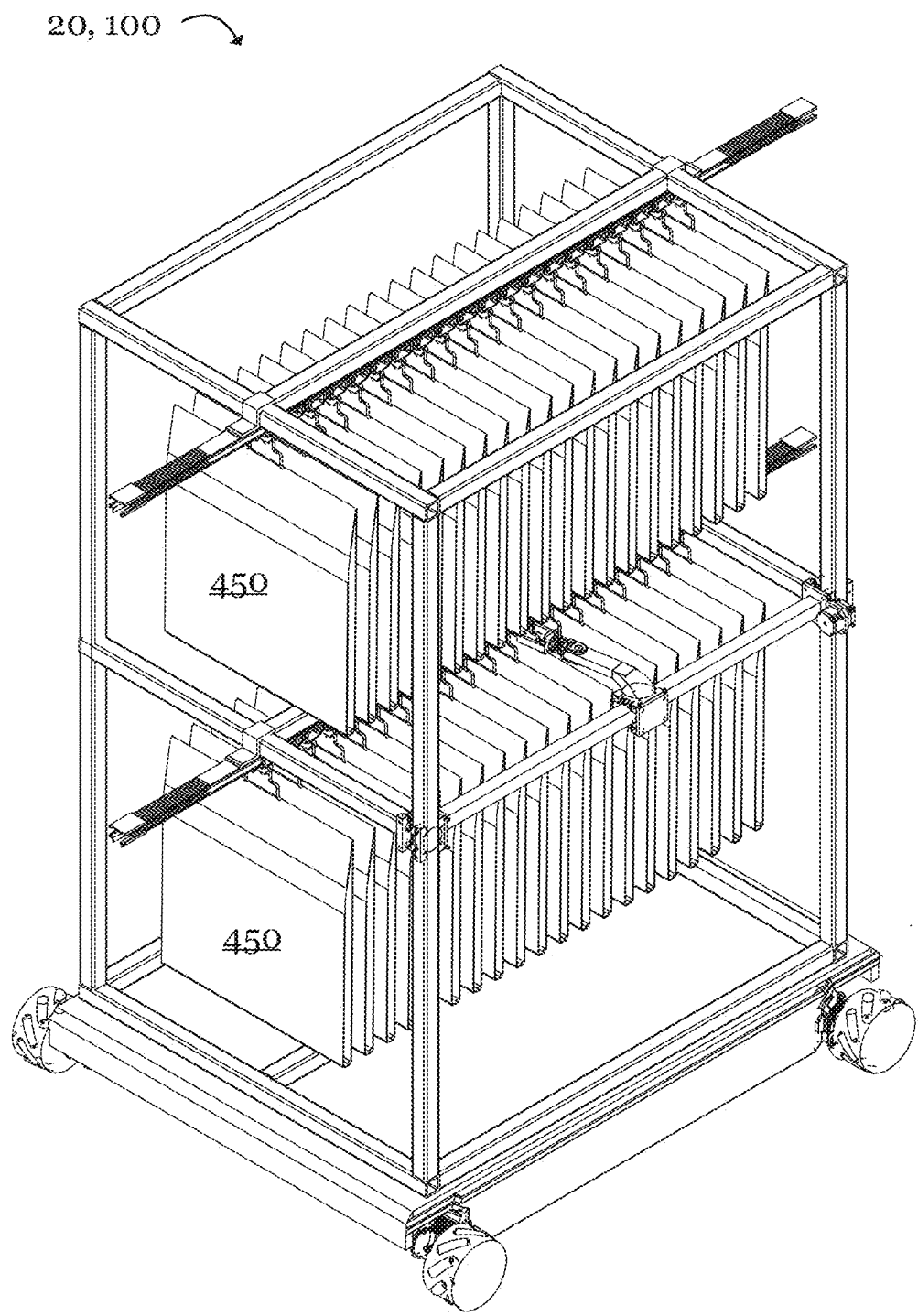

FIG. 5 is an isometric view of the vehicle shown in FIG. 2, in accordance with some embodiments. The vehicle is densely populated with containers.

Figure 6A:
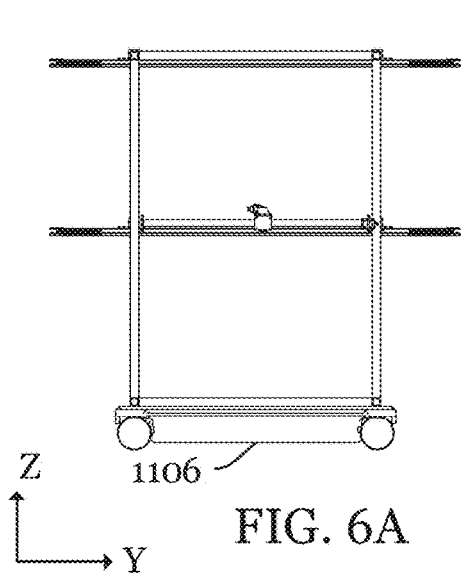
Figure 6B:
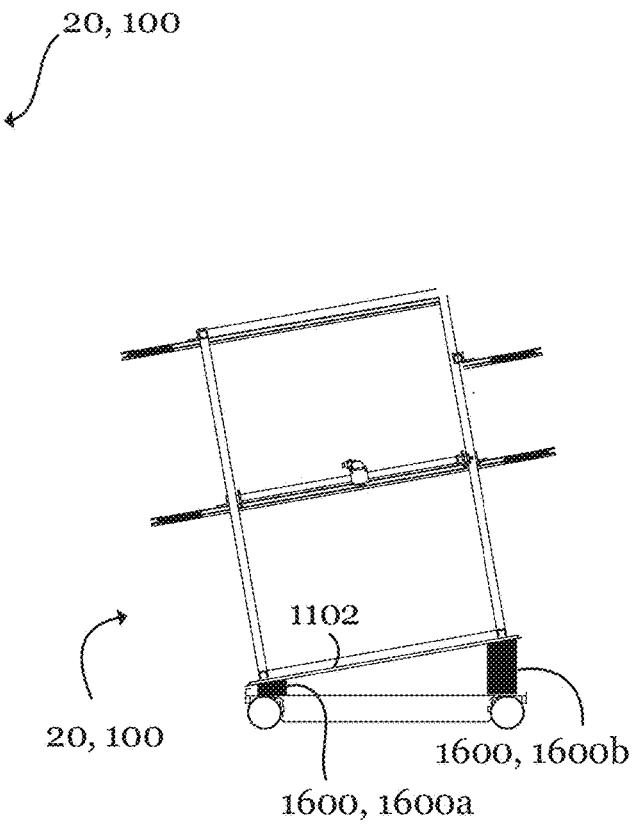
Figure 6C:
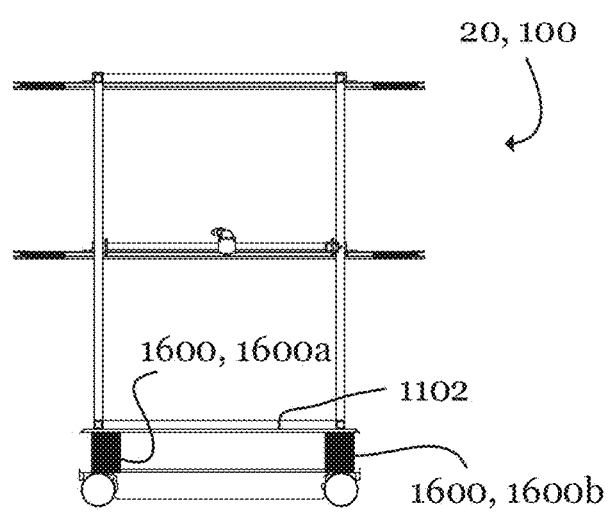

FIGS. 6A-6C illustrate operation of a hydraulic system in the vehicles shown in FIGS. 1 and 2, in accordance with some embodiments.

Figure 7:
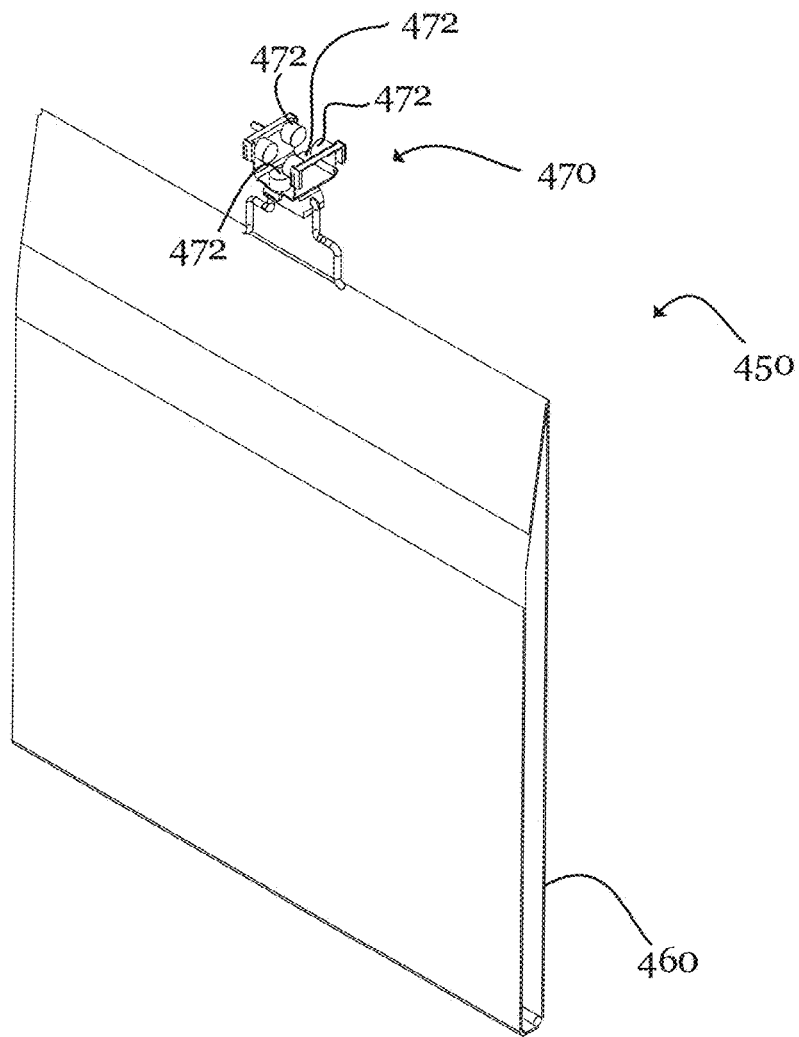

FIG. 7 is an isometric view of a container, in accordance with some embodiments.

Figure 8:
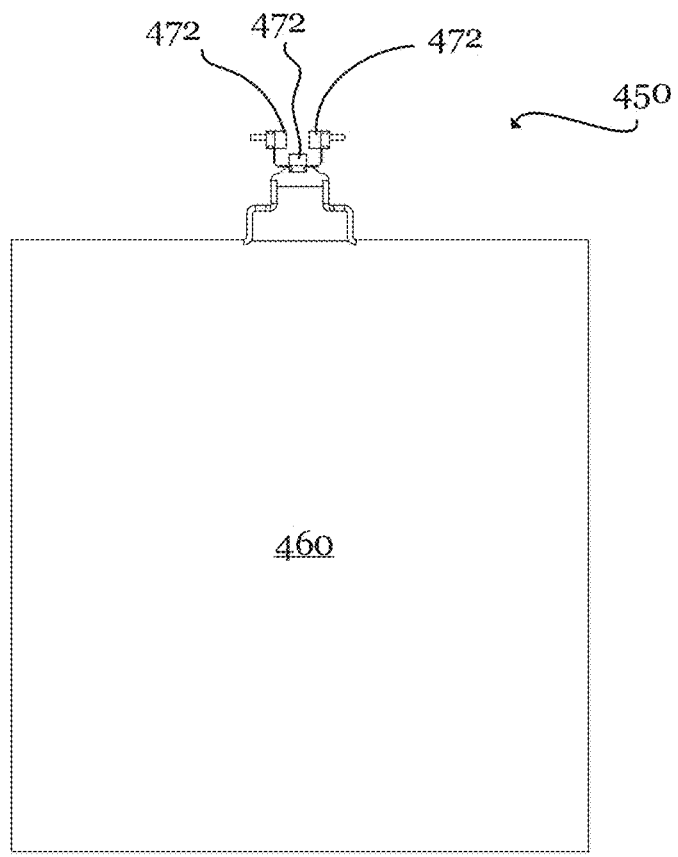
Figure 8:
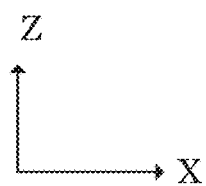

FIG. 8 is a front elevational view of the container, in accordance with some embodiments.

Figure 9:
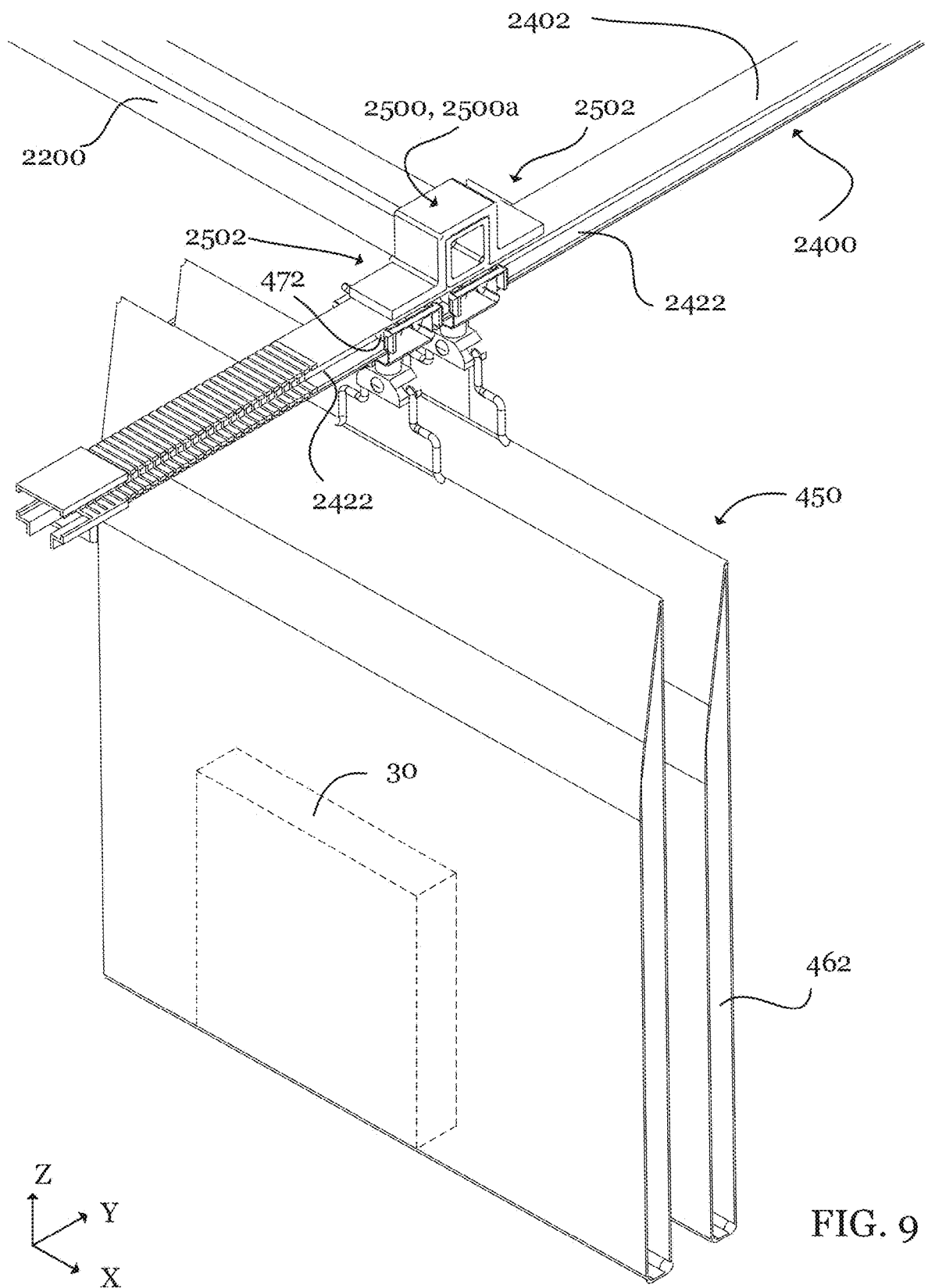

FIG. 9 is an isometric view of a container suspended from the vehicles shown in FIGS. 1 and 2, in accordance with some embodiments.

Figure 10:
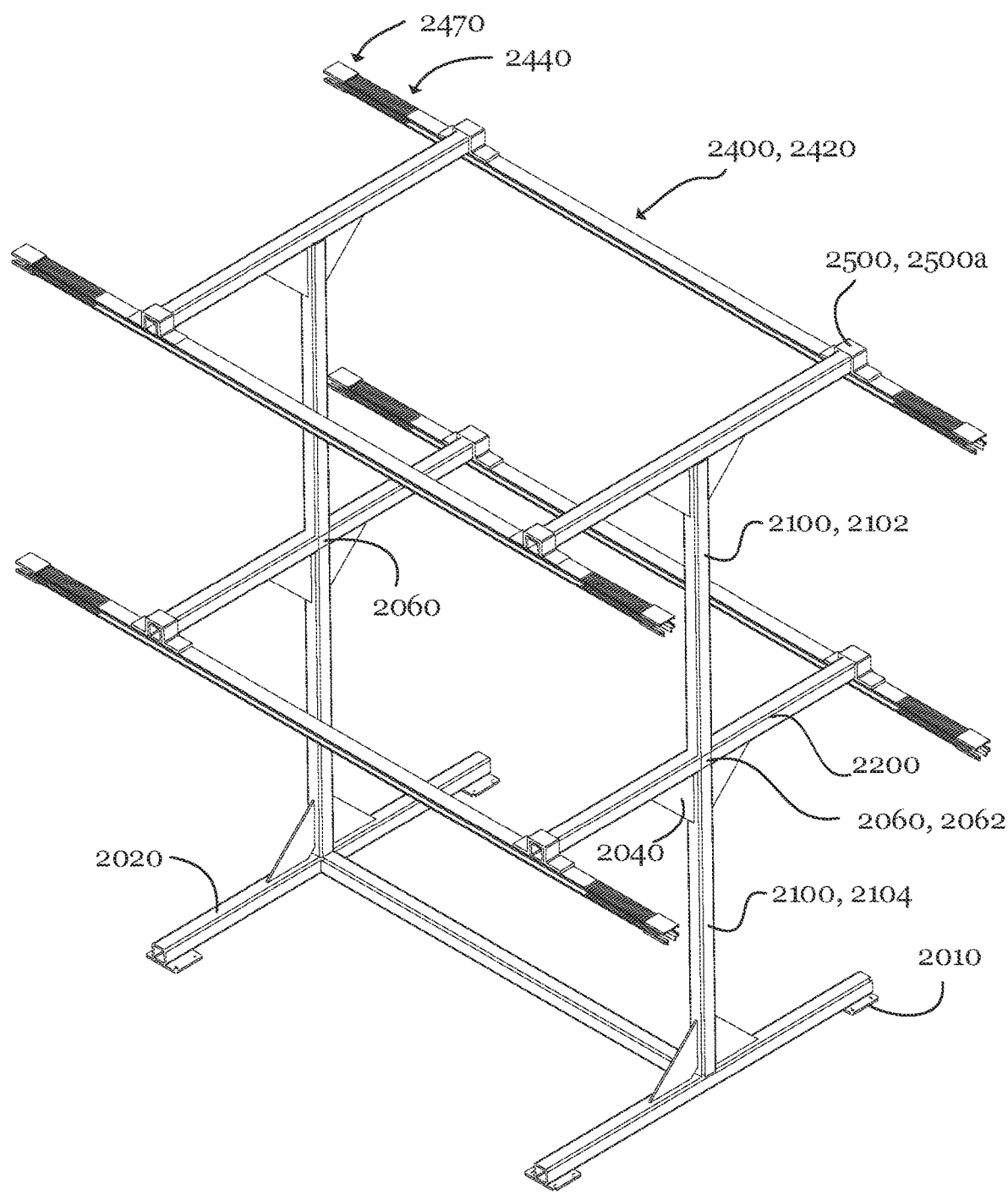

FIG. 10 is an isometric view of a rack for the vehicles shown in FIGS. 1 and 2, in accordance with some embodiments.

Figure 11:
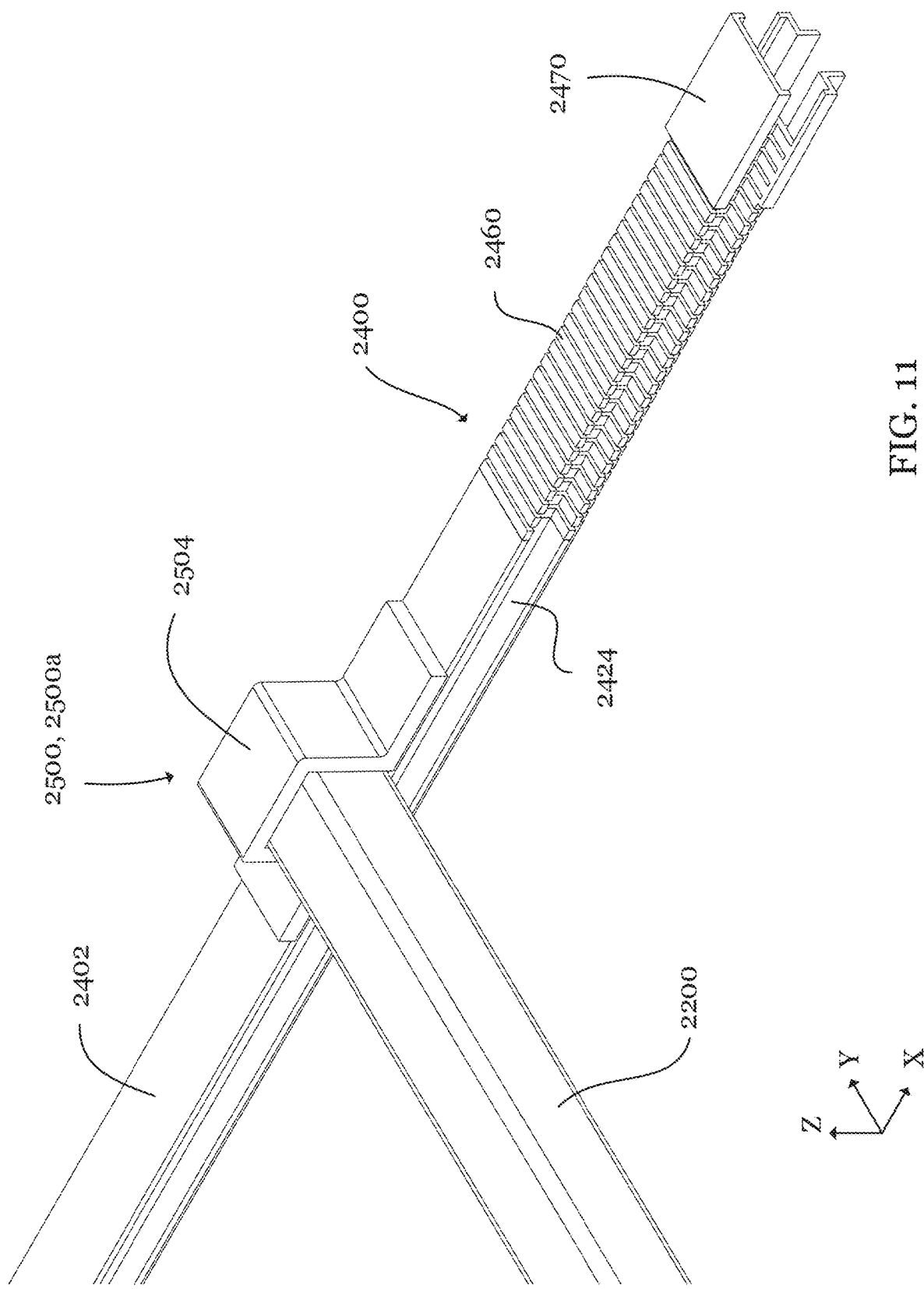

FIG. 11 is an isometric view of a portion of the rack shown in FIG. 10, in accordance with some embodiments.

Figure 12:
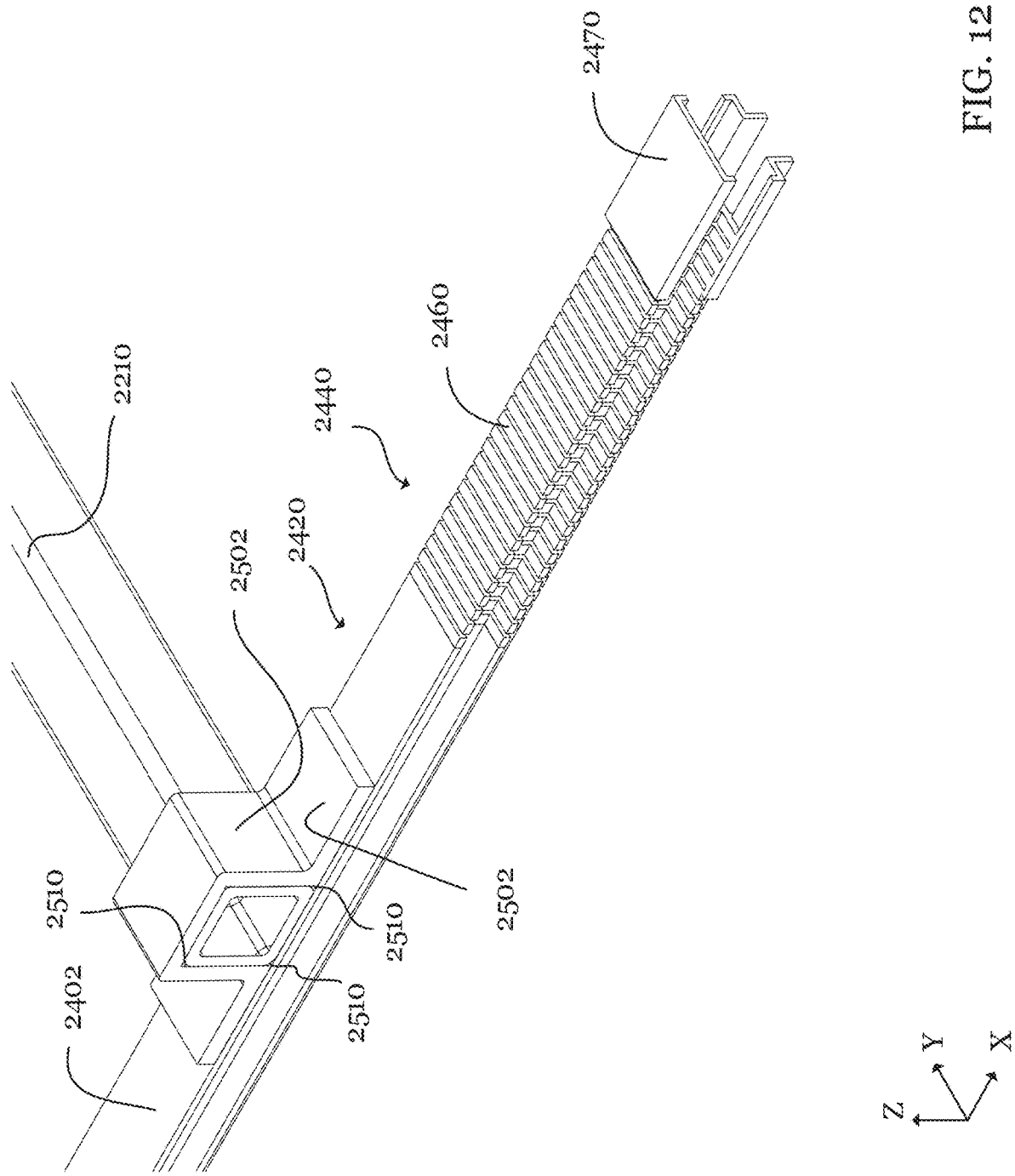

FIG. 12 is an isometric view of a different portion of the rack shown in FIG. 10, in accordance with some embodiments.

Figure 13:
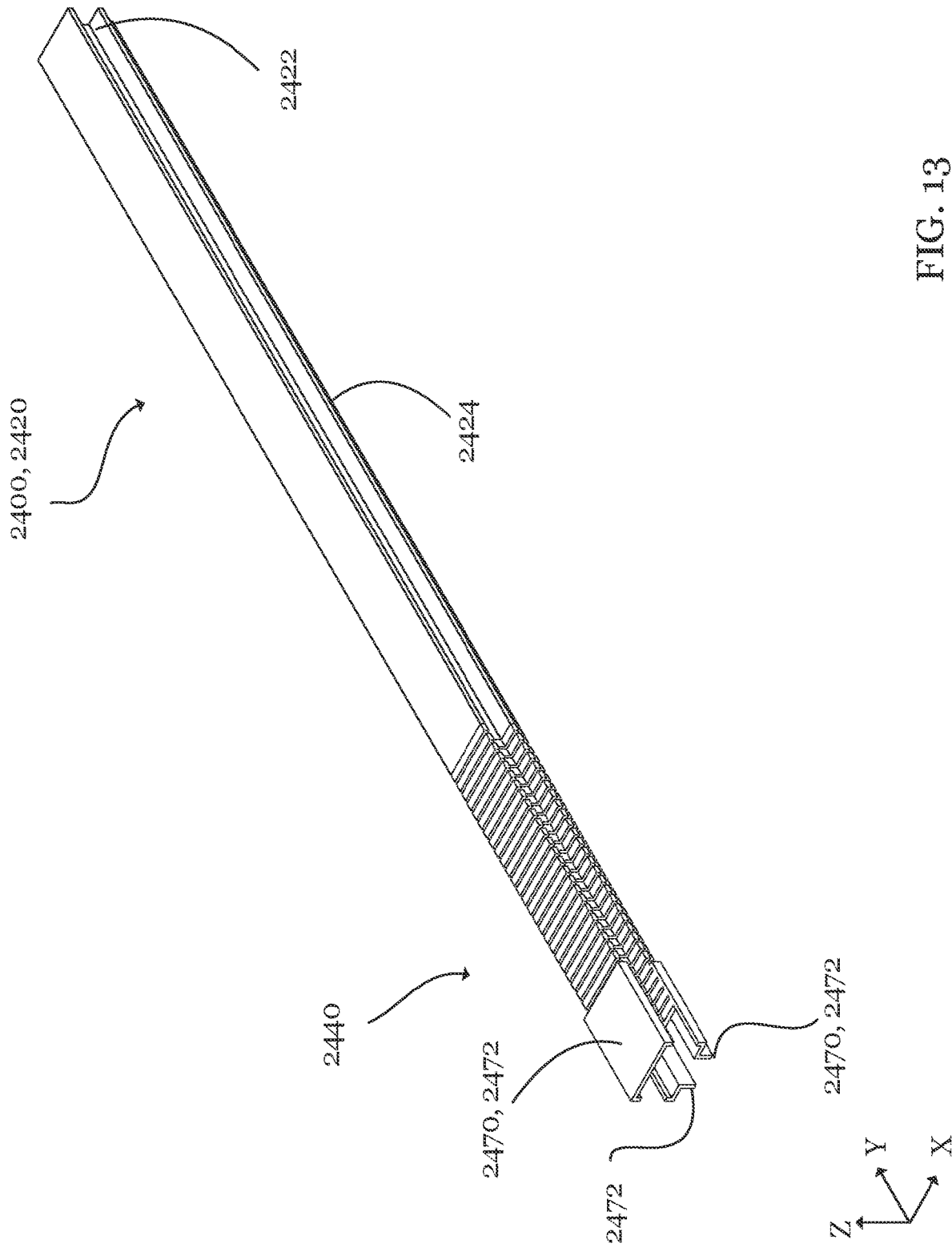

FIG. 13 is an isometric view of a rail for the vehicles shown in FIGS. 1 and 2, in accordance with some embodiments.

Figure 14:
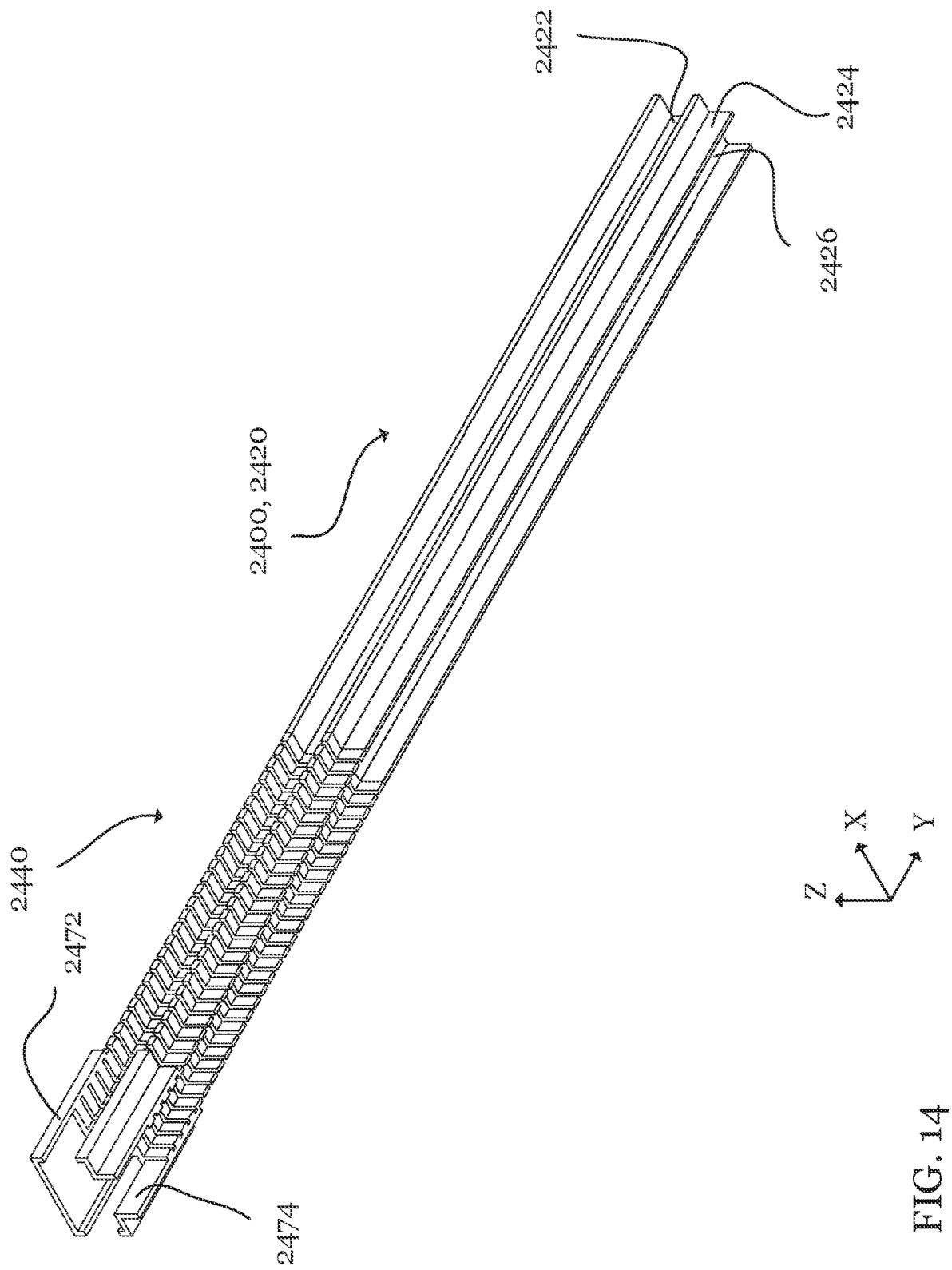

FIG. 14 is an isometric view of the vehicle rail shown in FIG. 13, in accordance with some embodiments.

Figure 15:
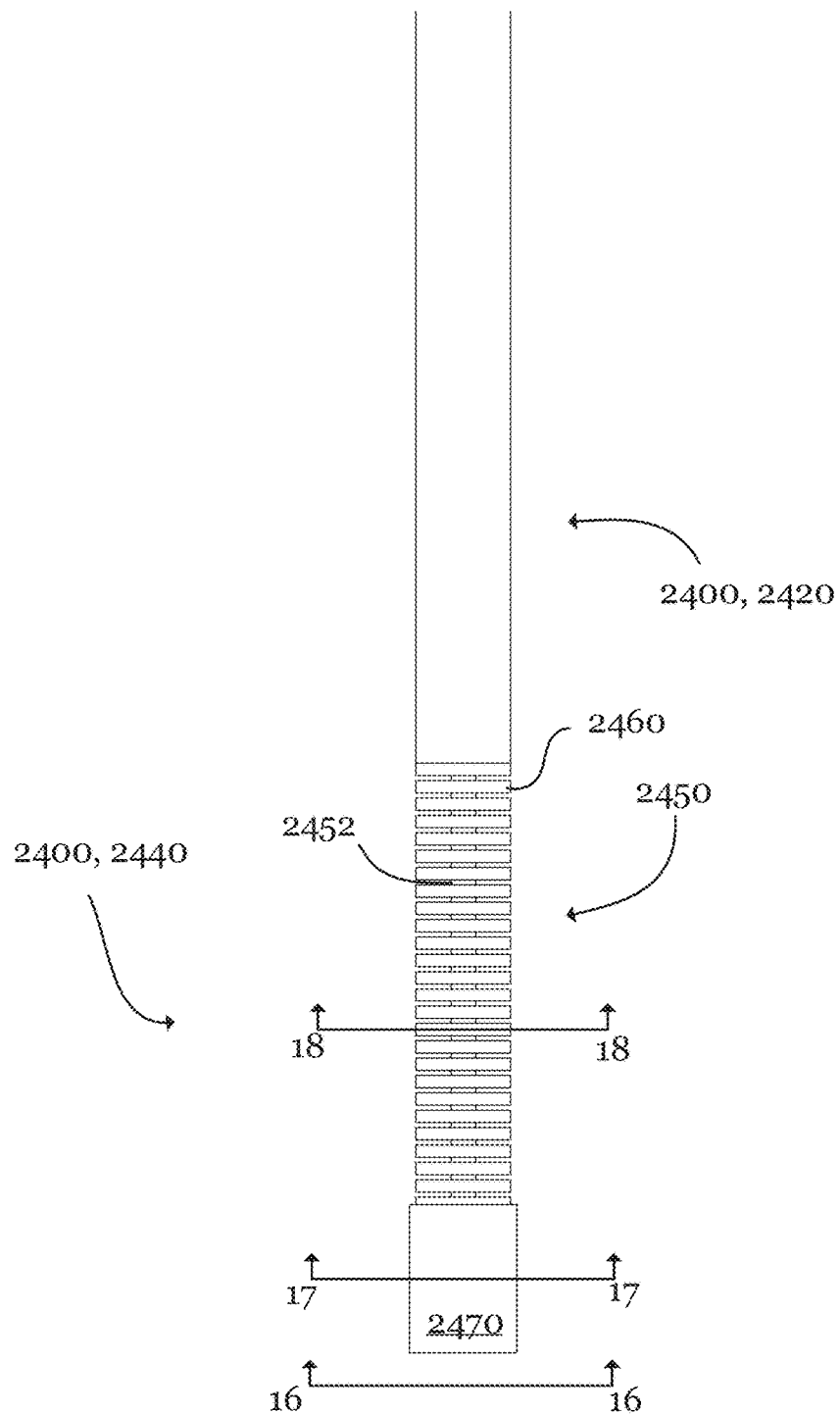

FIG. 15 is a top plan view of the vehicle rail shown in FIG. 13, in accordance with some embodiments.

Figure 16:
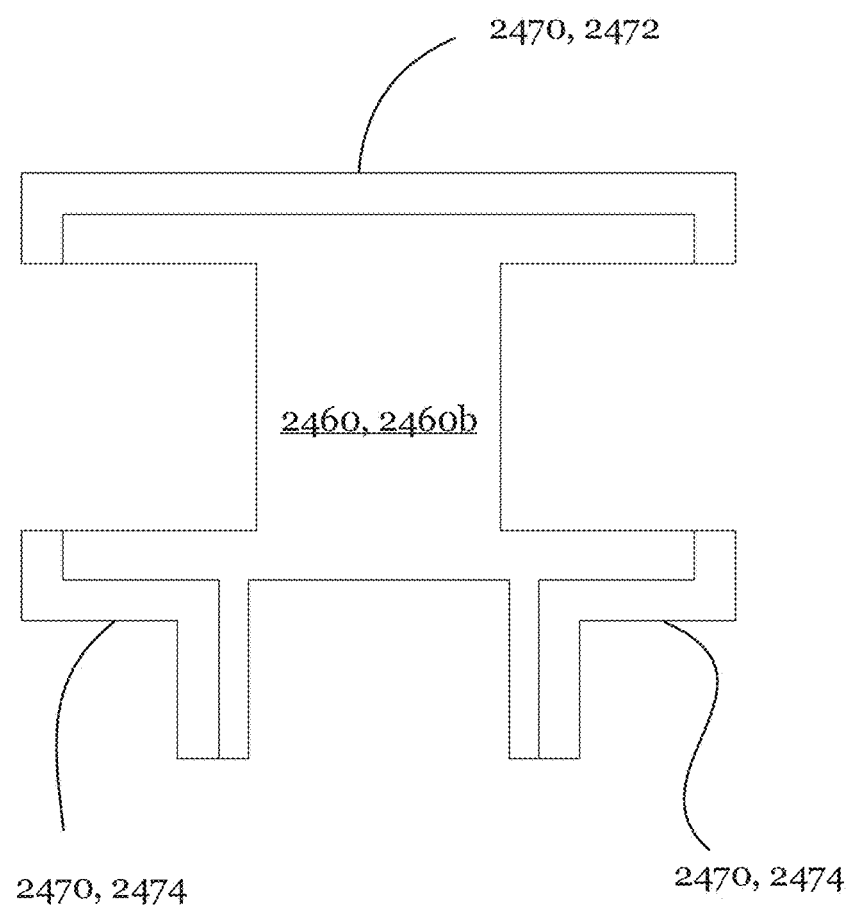

FIG. 16 is a cross-sectional and front elevational view through the vehicle rail from plane 16-16 in FIG. 15, in accordance with some embodiments.

Figure 17:
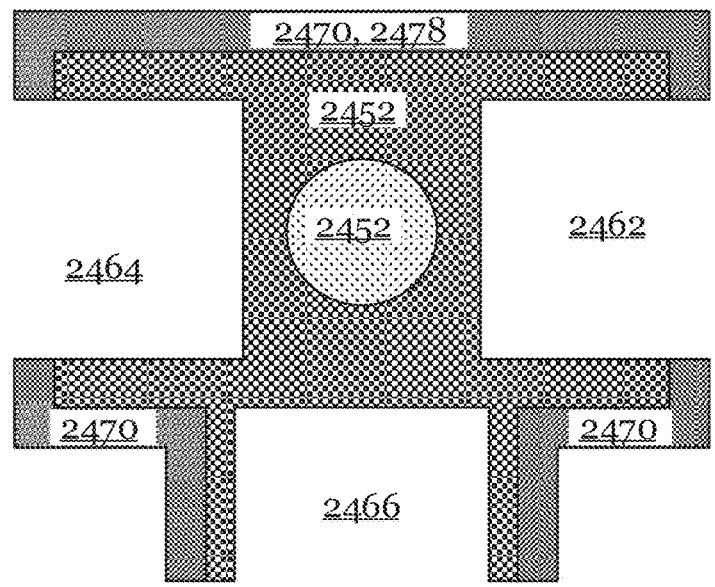

FIG. 17 is a cross-sectional and front elevational view of the vehicle rail from plane 17-17 in FIG. 15, in accordance with some embodiments.

Figure 18:
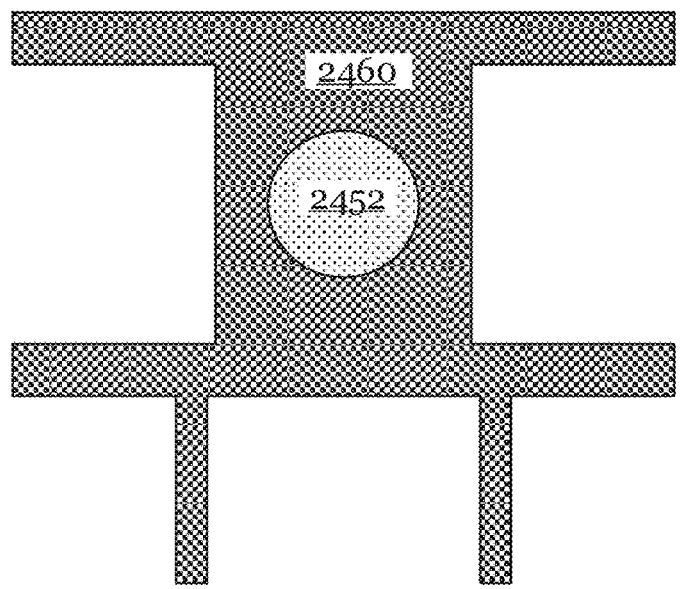
Figure 18:
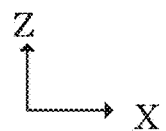

FIG. 18 is a cross-sectional and front elevational view through the vehicle rail from plane 18-18 in FIG. 15, in accordance with some embodiments.

Figure 19:
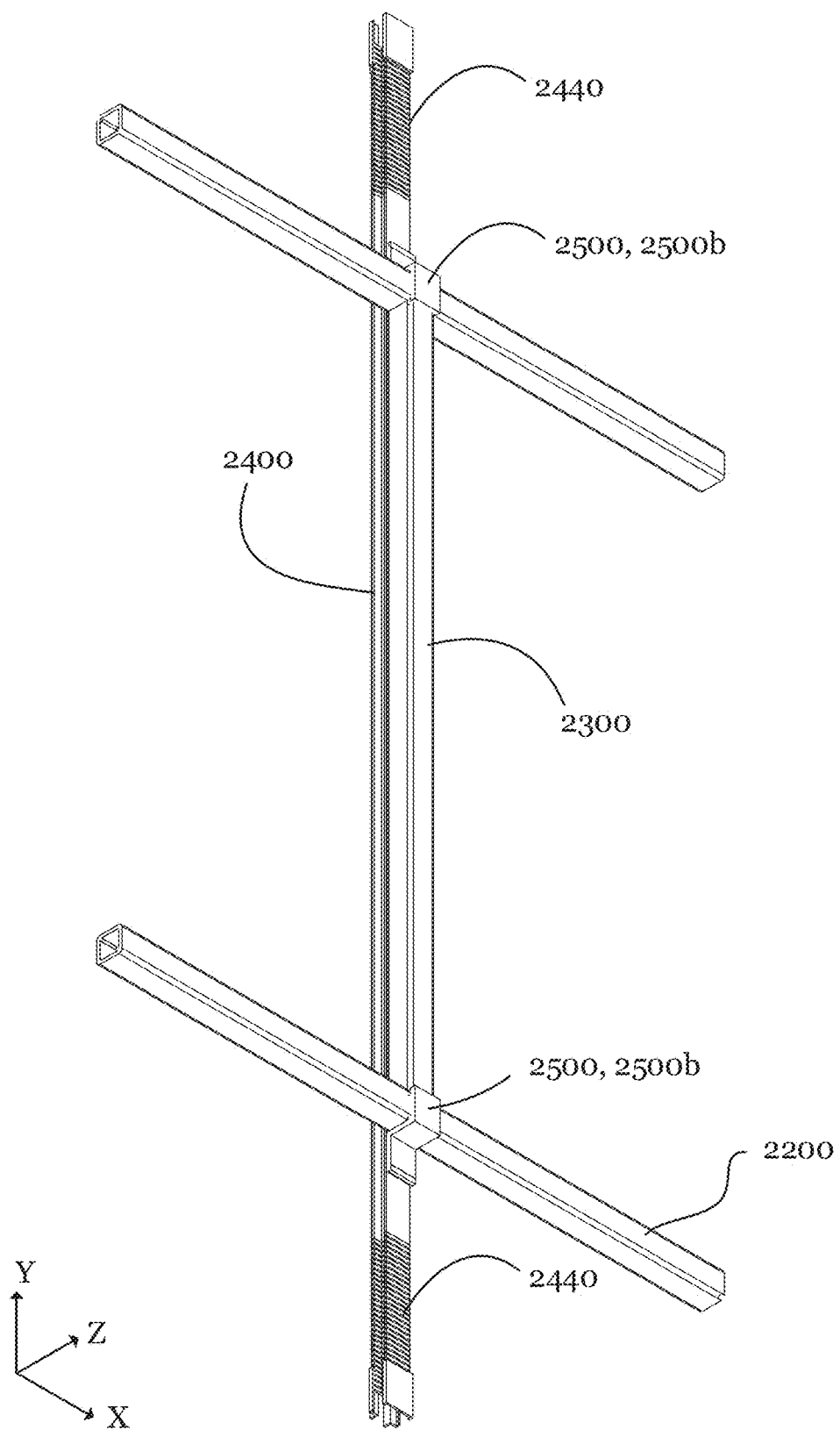

FIG. 19 is an isometric view a portion of the vehicle rack shown in FIG. 2, in accordance with some embodiments.

Figure 20:
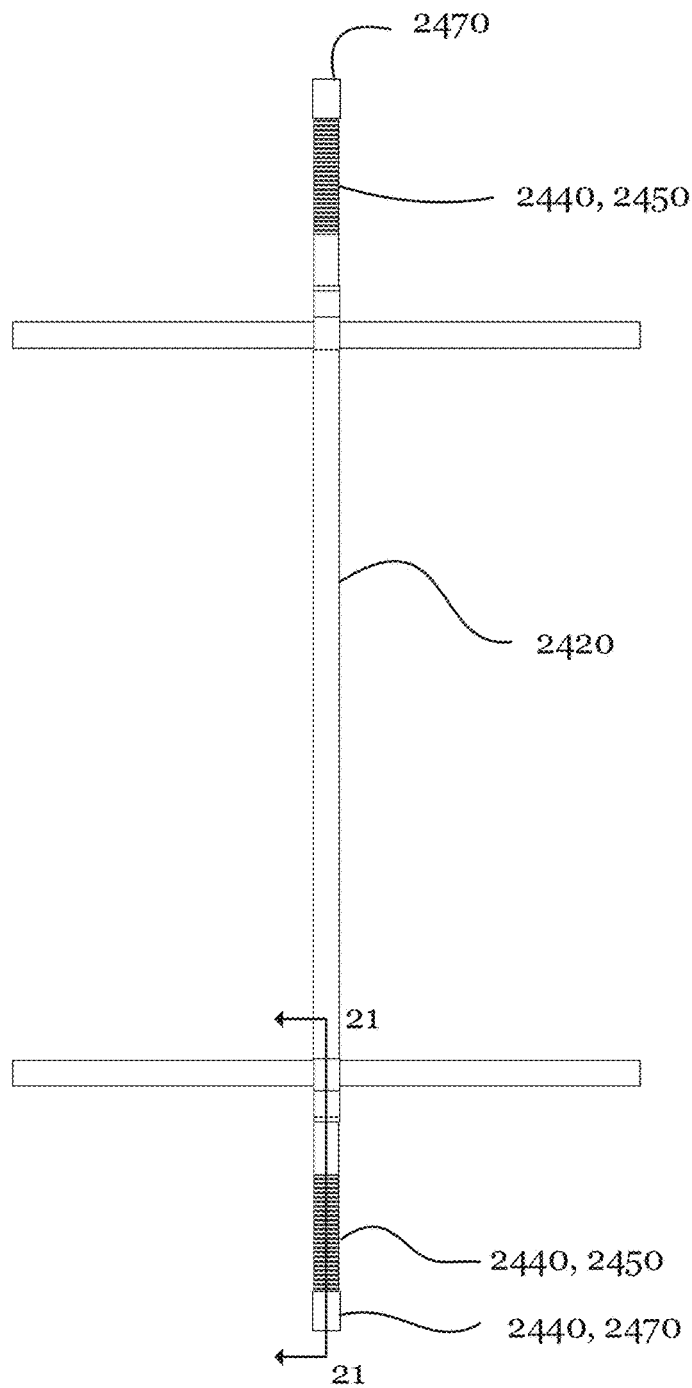

FIG. 20 is a top plan view of the rack shown in FIG. 19, in accordance with some embodiments.

Figure 21:
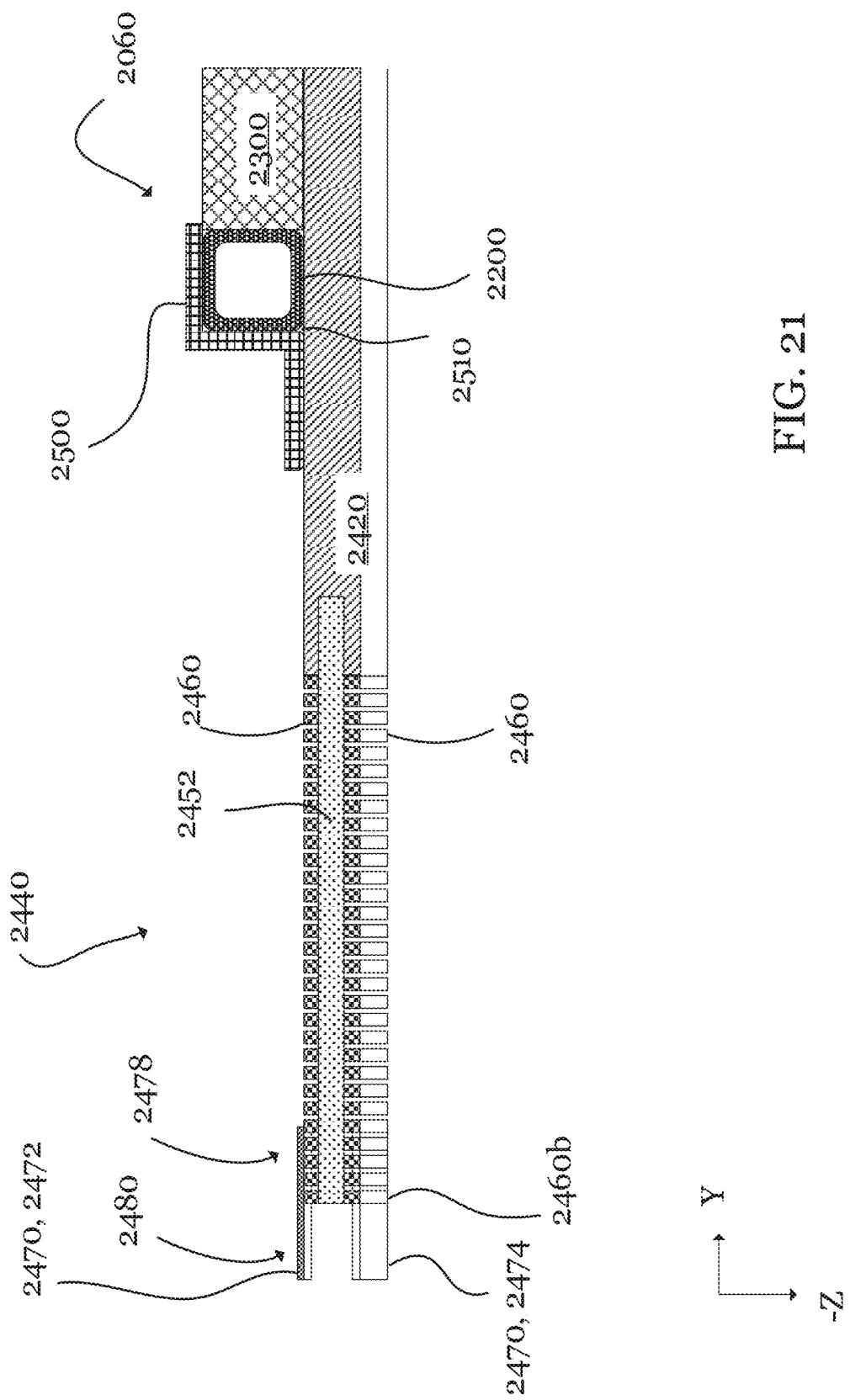

FIG. 21 is a cross-sectional and side elevational view through the rack from plane 21-21 in FIG. 20, in accordance with some embodiments.

Figure 22:
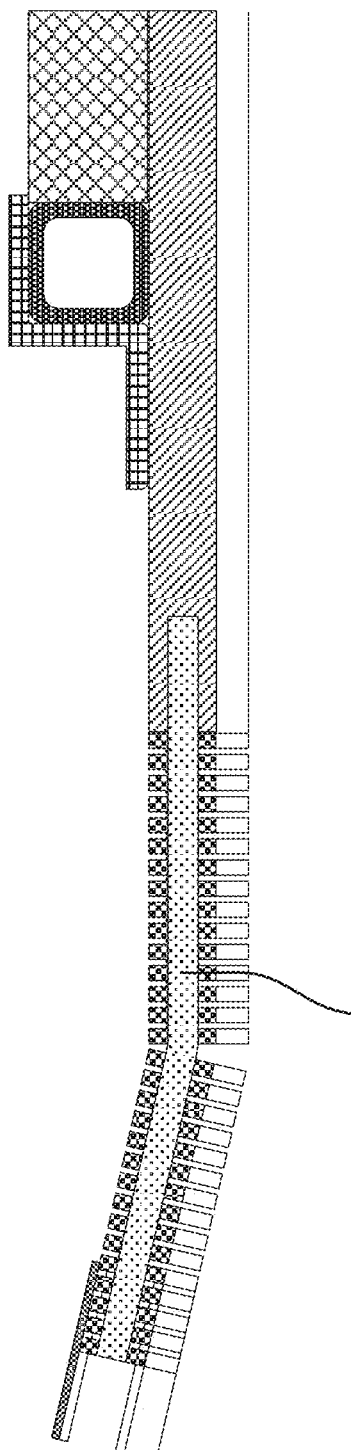

FIG. 22 is a cross-sectional and side elevational view through the rack from the perspective in FIG. 21, in accordance with some embodiments.

Figure 23:
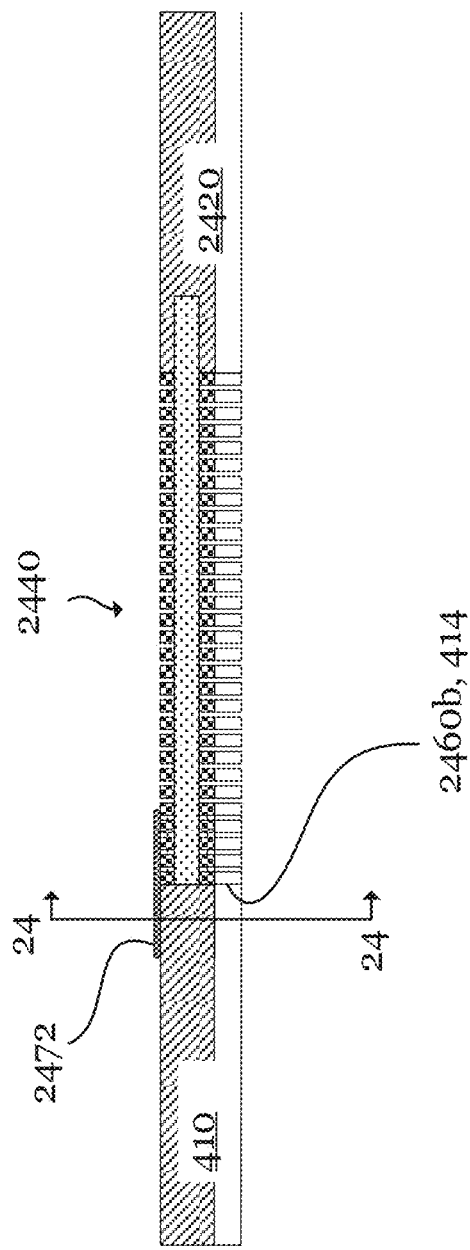

FIG. 23 is a cross-sectional and side elevational view through the rack when at least partially coupled with a system rail from the perspective in FIG. 21, in accordance with some embodiments.

Figure 24:
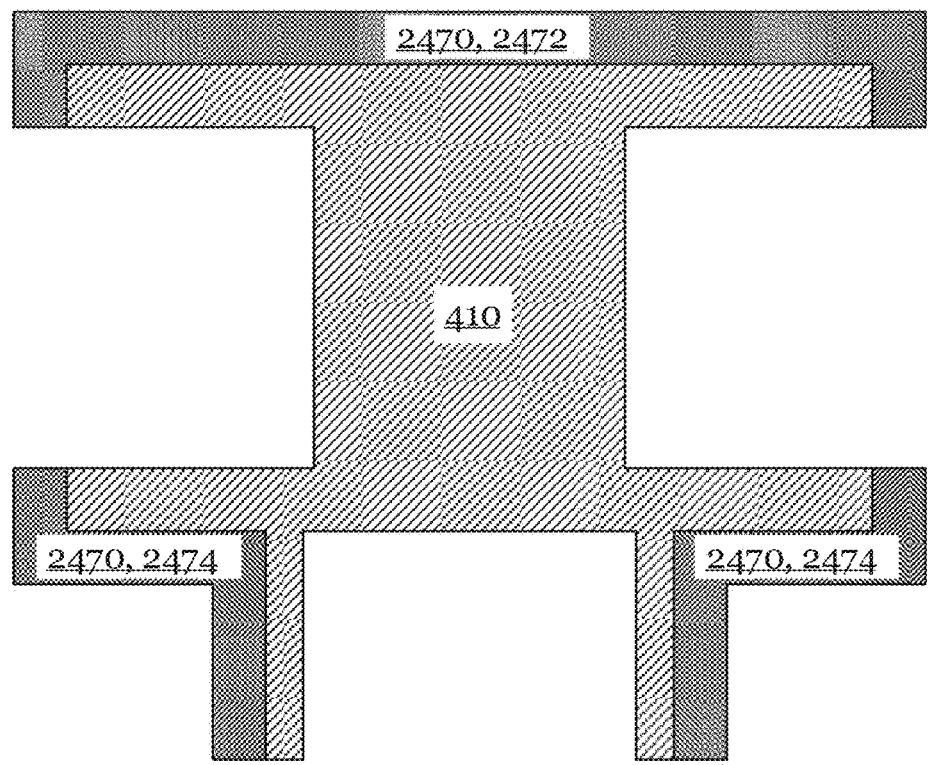

FIG. 24 is a cross-sectional and front elevational view through the rack and the system rail from plane 24-24 in FIG. 23, in accordance with some embodiments.

Figure 25:
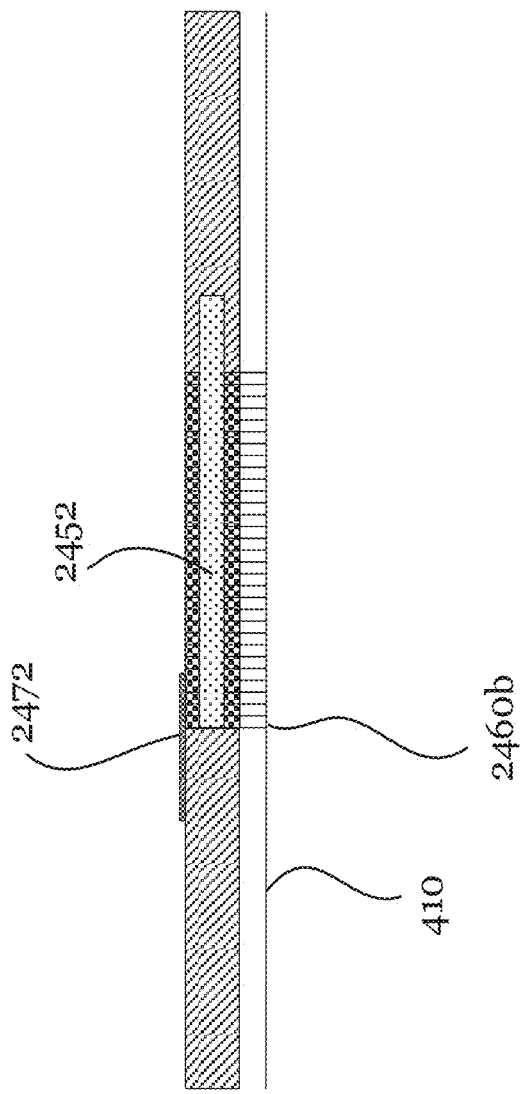

FIG. 25 is a cross-sectional and side elevational view through the rack when fully coupled with a system rail from the perspective in FIG. 21, in accordance with some embodiments.

Figure 26:
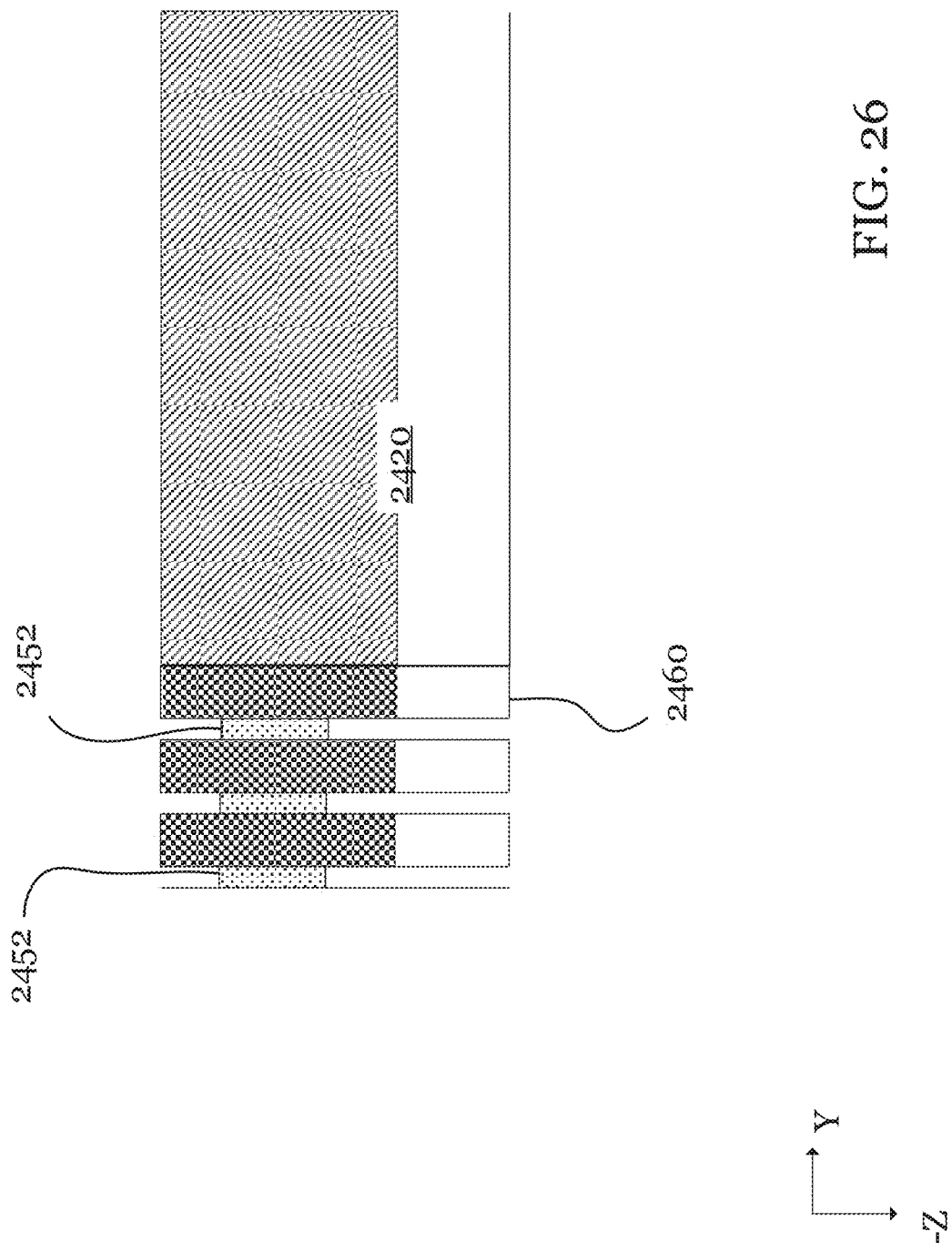

FIG. 26 is a cross-sectional and side elevational view through a vehicle rail with an alternate spine from the perspective in FIG. 21, in accordance with some embodiments.

Figure 27:
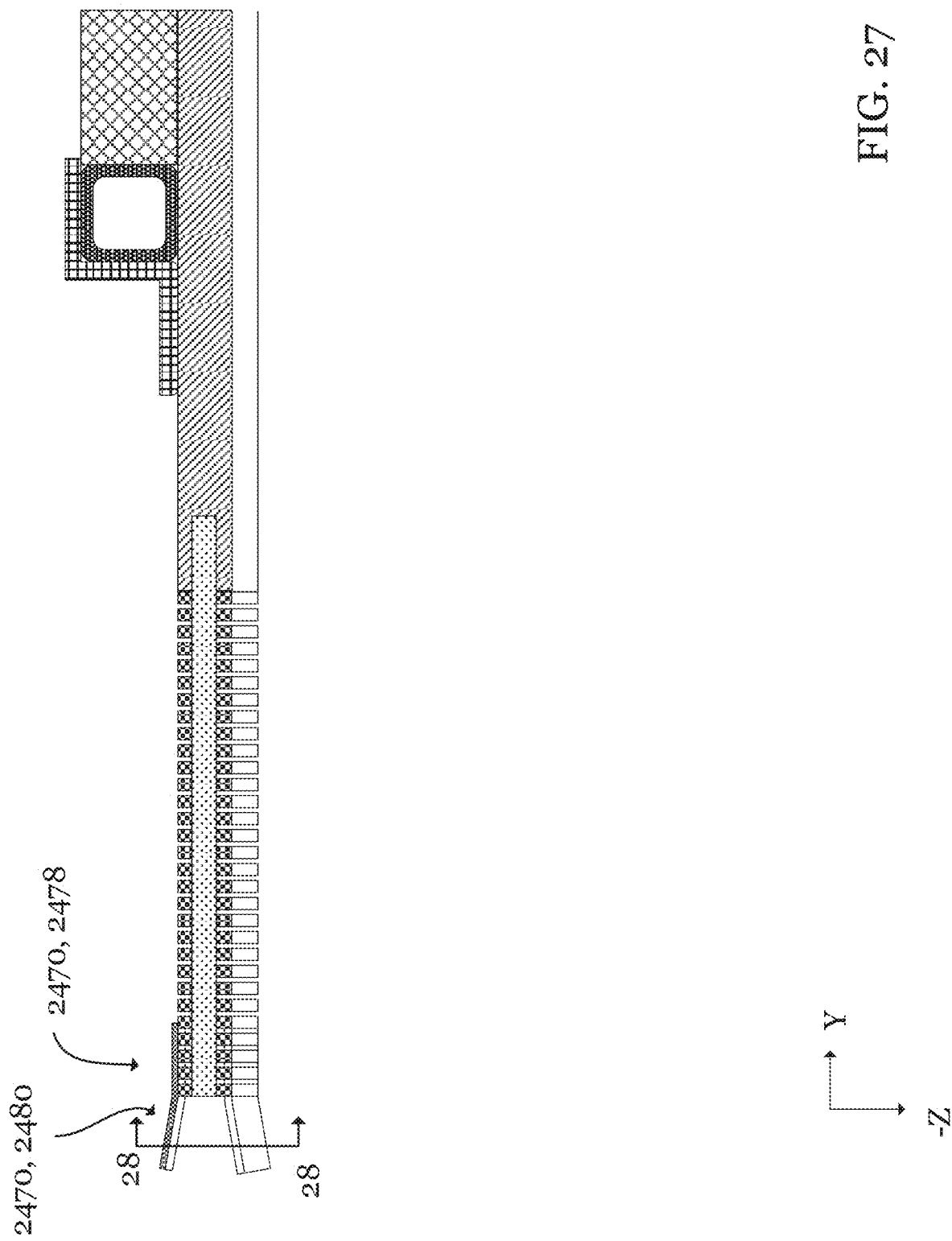

FIG. 27 is a cross-sectional and side elevational view through a vehicle rail with an alternate fitting from the perspective in FIG. 21, in accordance with some embodiments.

Figure 28:
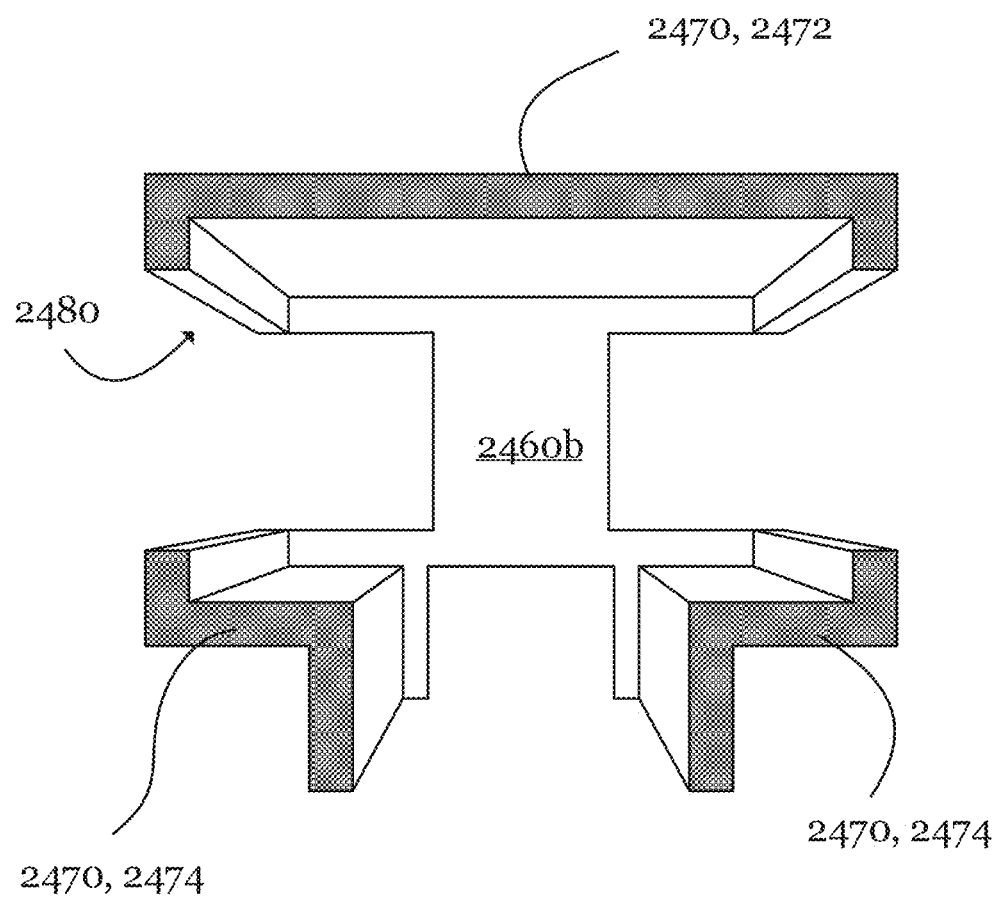

FIG. 28 is a cross-sectional and front elevational view through the alternate fitting from plane 28-28 in FIG. 27, in accordance with some embodiments.

Figure 29:
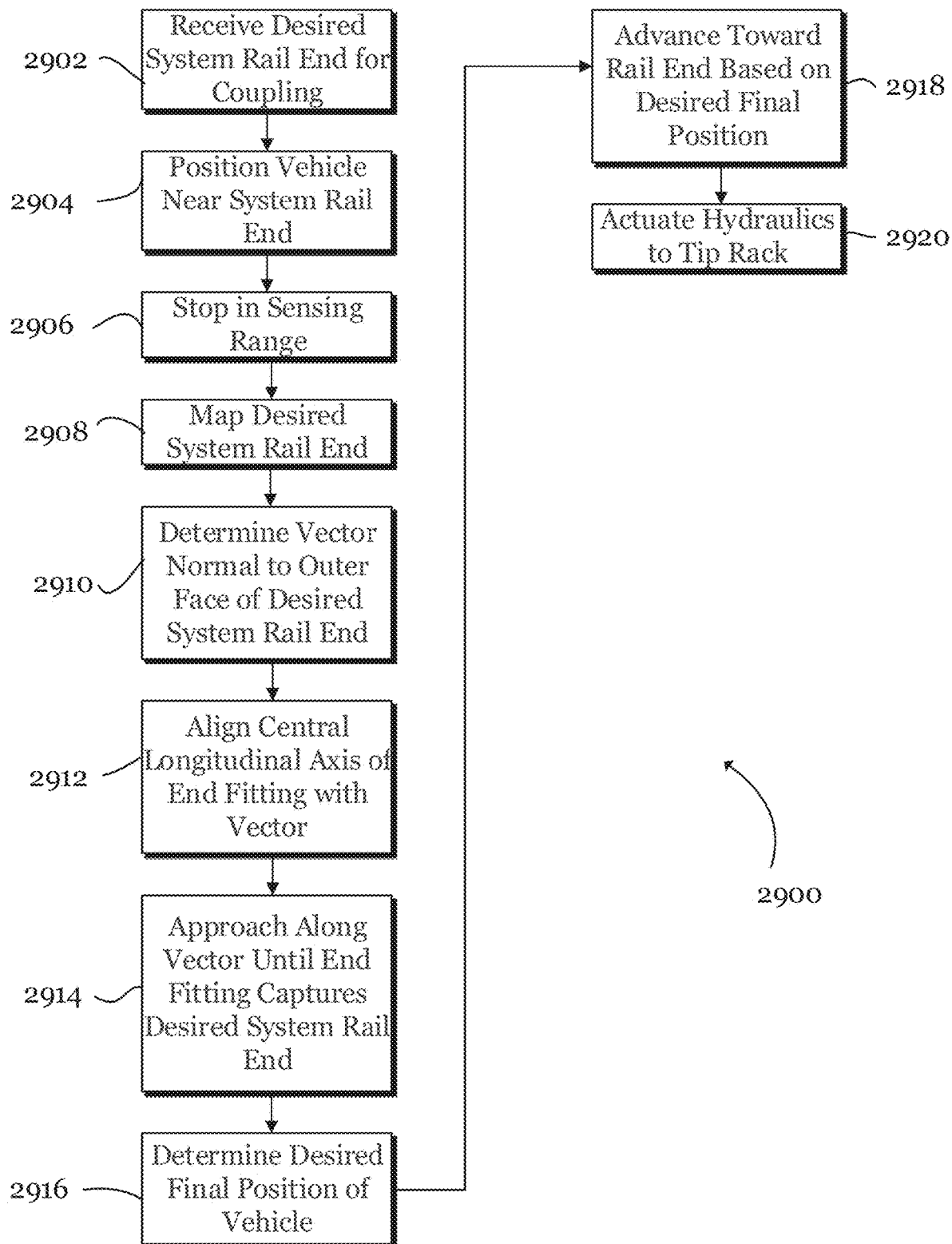

FIG. 29 is a block diagram of a method for coupling the vehicle with the rail system, in accordance with some embodiments.

Figure 30:
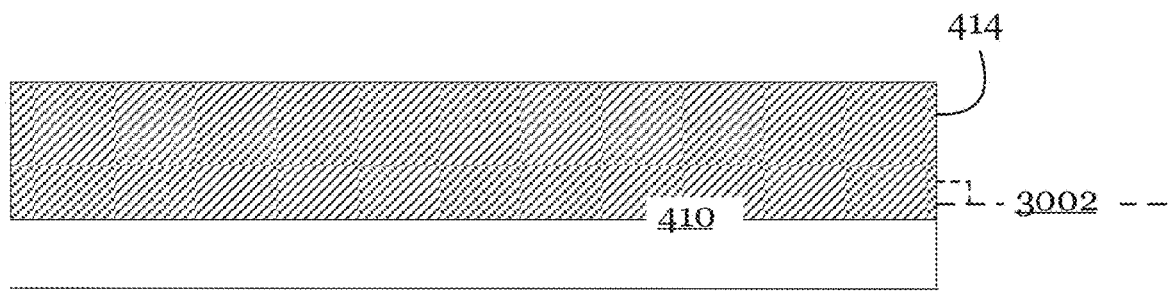
Figure 30:
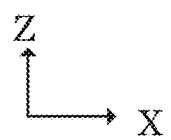

FIG. 30 is a cross-sectional and side elevational view through a system rail from the perspective in FIG. 21, in accordance with some embodiments. The broken "L" identifies a right angle. The broken line is a vector.

Figure 31A:
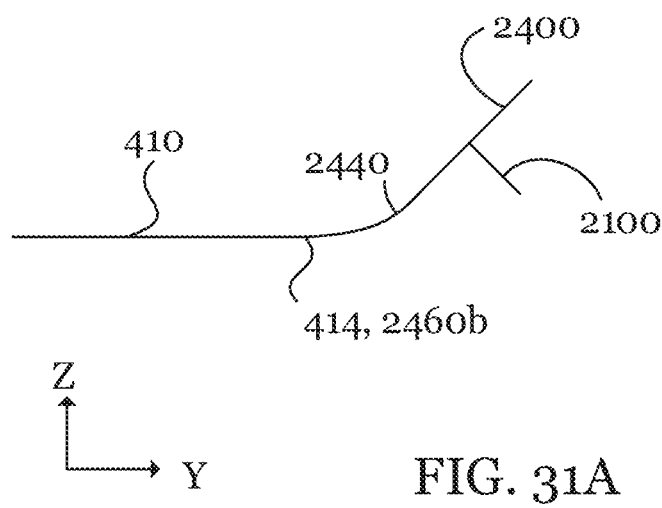
Figure 31B:
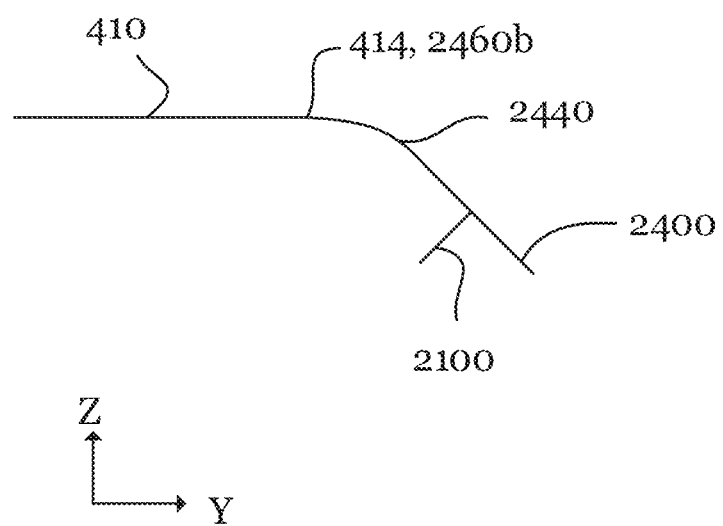

FIGS. 31A and 31B are schematic side elevational views of a system rail coupled to a vehicle rail, in accordance with some embodiments.

DETAILED DESCRIPTION

While the features, methods, devices, and systems described herein may be embodied in various forms, there are shown in the drawings, and will hereinafter be described, some illustrative (i.e., example) embodiments. The claimed inventions are not limited to the illustrative embodiments. Therefore, some implementations of the claimed inventions will have different features than those set out in this disclosure.

Further, implementations of the claimed inventions can make changes with respect to the claims without departing from the spirit or scope of the application. Therefore, the claimed inventions are intended to embrace their full-range of equivalents.

Unless otherwise indicated, any directions reflect the orientations of the components shown in the corresponding drawings and do not limit the scope of the present disclosure. Any absolute term (e.g., large, small) can be replaced with a corresponding relative term (e.g., larger, smaller). Part headings are interspersed throughout the detailed description. The locations of the part headings have no underlying significance. The application can be read as if the part headings were omitted.

Part 1

FIG. 1 shows a first exemplary embodiment of a vehicle 10, 100 (also called a first vehicle, a first container transport assembly, an automated vehicle, etc.). FIG. 2 shows a second exemplary embodiment of the vehicle 20, 100 (also called a second vehicle, a first container transport assembly, an automated vehicle, etc.). In FIG. 1, first vehicle 10, 100 is sporadically populated with containers 450. In FIG. 2, second vehicle 20, 100 is unpopulated with containers 450. In FIG. 5, second vehicle 20, 100 is densely populated with containers 450. Although not shown, first vehicle 10, 100 can be in a densely populated state.

First and second vehicles 10, 20, 100 can have common features. Thus, unless otherwise indicated, features disclosed below can apply to first vehicle 10, 100 and/or second vehicle 20, 100. Put differently, when the present disclosure refers to "vehicle 100", the reference can apply to either one or both of first vehicle 10, 100 and second vehicle 20, 100.

Therefore, while some of the Figures show one vehicle embodiment (e.g., FIG. 11 is a zoomed view of a rack of first vehicle 10, 100 and FIG. 19 is a view of a second rack of second vehicle 20, 100), any features described with reference to those Figures should be understood to optionally apply to the other vehicle embodiment. According to some embodiments, first vehicle 10, 100 and second vehicle 20, 100 are built from identical components and the only difference between first vehicle 10, 100 and second vehicle 20, 100 is the arrangement of those components in rack 2000 (discussed below).

Referring to FIG. 3, vehicle 100 can include a processing system ("PS") 300. PS 300 is discussed in further detail below. PS 300 can be configured to perform (e.g., cause vehicle 100 to perform) any and all of the operations (e.g., methods) described herein.

Referring to FIG. 4, vehicle 100 (i.e., first vehicle 10, 100 and/or second vehicle 20, 100) can be configured to couple with a rail system 400. Rail system 400 can be disposed in a warehouse and be configured to transport containers 450 (also called container assemblies and further discussed below). Rail system 400 can include a plurality of system rails 410, which can be fixed within the warehouse.

Containers 450 can slide (e.g., roll) along tracks defined by fixed system rails 410. Although shown as being sporadic, rail system 400 can be saturated with containers 450. Periodically disposed motors 420 can push containers 450 along system rails 410. Motors 420 can be fixed or moveable along system rails 410. Switches 430 can direct containers 450 where system rails 410 diverge. The solid lines can map to a single system rail 410 or a plurality of parallel system rails 410. As with all features disclosed herein, the embodiment of FIG. 4 is exemplary. The features disclosed herein can be applied to other rail systems 400 and other contexts.

Vehicle rails 2400 are described below. As discussed below, vehicle rails 2400 can include a main portion 2420. System rails 410 can have the same structure as vehicle rail main portion 2420 and thus, as described below, define three channels for receiving container wheels 472 (discussed below). As shown in FIG. 4, system rails 410 can arc.

System rails 410 can terminate at ends 414. Vehicles 100 can couple with a system rail end 414 to load (i.e., receive) and/or unload (i.e., deliver, supply) container assemblies 450. Coupling between vehicle rails 2400 and system rails 410 is further discussed below. As shown in FIG. 4, vehicle 100, 100a completes a first rail loop 402. Thus, vehicle 100, 100a is coupled at both longitudinal ends to rail ends 414, 414a, 414b. In contrast, vehicle 100, 100b, is only coupled at one longitudinal end to a rail end 414, 414c. Both first and second vehicles 10, 20, 100 can be simultaneously coupled to rail system 400.

As stated above, the present disclosure generally uses the terms "longitudinal", "transverse", and "vertical" to give the reader context when viewing the Figures. Referring to the Figures, depth along the X-axis can be "transverse", depth along the Y-axis can be "longitudinal", and depth along the Z-axis can be "vertical".

Part 2

Referring to FIGS. 1 and 2, vehicle 100 can include a base 1000, a rack 2000, and containers 450. Base 1000 can support rack 2000 and containers 450. Base 1000 can house internal electronic components (e.g., features of PS 300 such as motors, processors, memory, batteries, etc.).

Rack 2000 can be mounted to base 1000. Rack 2000 can suspend containers 450. Rack 2000 can be configured to couple with system rails 410 via end couplings 2440 (further discussed below). As shown in FIG. 1, first vehicle 10, 100 can simultaneously couple with up to eight system rail ends 414. As shown in FIG. 2, second vehicle 20, 100 can simultaneously couple with up to four system rail ends 414.

Referring to FIGS. 1, 2, and 4, and upon coupling between rack assembly 2000 and rail system 400, containers 450 can (a) move across rack assembly 2000 and onto rail system 400 and/or (b) move from rail system 400 onto rack assembly 2000. Containers 450 can be configured to hold (i.e., store) items 30 (FIG. 8). Containers 450 can be configured to slide (e.g., roll via wheels 472, such as roller bearings—shown in FIG. 8) across tracks defined by rack assembly 2000 and rail system 500. FIG. 9 shows a container wheel 472 moveably seated within a channel defined by vehicle rail 2400.

Referring to FIGS. 1 and 2, base 1000 (also called a base assembly) can include a platform 1100. Platform 1100 can be a solid and heavy material (e.g., steel or another metal) to lower the center of gravity of vehicle 1000. Platform 1100 can serve as a housing for PS 300. Platform 1100 can be box-shaped with a flat upper surface 1102 for mounting rack assembly 2000. Platform 1100 can include an arced outer bumper 1104 made from an elastomeric material (e.g., rubber) for impact resistance.

Outer bumper 1104 can longitudinally project from platform 1100. As shown in FIGS. 1 and 2, outer bumper 1104 can longitudinally project from vehicle 100 to a lesser extent than rack assembly 2000 to enable coupling between the rack assemblies 2000 of multiple vehicles 100. According to some embodiments, outer bumper 1104 is moveable between an extended position (not shown) and a retracted position (FIGS. 1 and 2). When in the extended position (not shown), outer bumper 1104 can longitudinally extend past the longitudinal ends of rack assembly 2000 to discourage contact between rack assembly 2000 and external objects during movement of vehicle 100. PS 300 can be configured to automatically actuate outer bumper 1104 between the extended and retracted positions.

Base 1000 can include, and platform 1100 can support, one or more electric motors 1202. At least one motor 1202 can be drivingly coupled to one or more wheels 1204 via one or more axles 1206. Only some of wheels 1204 can be directly driven by motors. For example, vehicle 100 can be front-wheel drive, rear-wheel drive, or all-wheel drive. PS 300 can be configured to actuate electric motors 1202 to (a) accelerate vehicle 100 and (b) turn vehicle 100. Platform 1100 can include an undercarriage plate 1106 (FIG. 6A) for protecting motors 1202 and axles 1206 from ground debris.

Base 1000 can include, and platform 1100 can support, one or more hydraulics systems 1600 (e.g., a longitudinally forward system 1600a and a longitudinally rearward system 1600b) for tilting rack 2000 with respect to the vertical axis. FIGS. 6A-6C schematically illustrate hydraulics systems 1600. Hydraulics systems 1600 can be called riser systems. Instead of hydraulics, other lifting mechanisms can be applied.

In FIG. 6A, hydraulics system 1600 is a retracted state such that an upper surface 1102 of platform 1100 is parallel to ground. In FIG. 6B, hydraulics system 1600 is in an extended state such that upper surface 1102 (and therefore rack 2000) is sloped with respect to ground (which lies in the X-Y plane). In the sloped state, gravity can move containers 450 from vehicle 100 to system rail 410 or from rail system 410 to vehicle 100. Although not shown, vehicle 100 can be tilted in the opposite direction by raising longitudinally forward hydraulic system 1600a above longitudinally rearward hydraulic system 1600b. As shown in FIG. 6C, hydraulics system 1600 lift both longitudinal ends of vehicle 100 by the same amount to enable vertical alignment between rack 2000 and system rail 410.

Part 3

Rack 2000 (also called a rack assembly, a beam assembly, a support assembly, a support tree) can be securely mounted to upper surface 1102 of platform 1100 (e.g., via four bolted connections 2010). FIG. 10 is an isolated view of a first embodiment of rack 2000, 2000a for first vehicle 10, 100. FIG. 2 shows a second embodiment of rack 2000, 2000b for second vehicle 20, 100. As previously discussed, any features of rack 2000 can apply to first rack 2000a and/or second rack 2000b unless stated otherwise.

Referring to FIGS. 2 and 10, rack 2000 can include vertical beams 2100, transverse beams 2200, longitudinal beams 2300, and vehicle rails 2400. Beams 2100, 2200, 2300 generally support vehicle rails 2400 (and the containers 450 suspended therefrom). Beams 2100, 2200, 2300 can be called rods, posts, supports, etc. Beams 2100, 2200, 2300 can be connected in the manner shown in FIGS. 2 and 10. Beams 2100, 2200, 2300 can be hollow.

As stated above, bolted connections 2010 can affix rack 2000 to platform 1100 (FIGS. 1 and 10). Each bolted connection 2010 can include a plate 2012 welded to a bottom of one or more beams 2100, 2200, 2300. Bolts 2014 can extend through plate 2012. Nuts or other compressive elements (not shown) can be provided on an underside of platform 1100 and threaded onto bolts 2014 to thereby compress plate 2012 against platform upper surface 1102.

Although not shown, second vehicle 20, 100 can include bolted connections 2010 (also called fastener assemblies). According to some embodiments, first and second vehicles 10, 20, 100 can share the same base 1000 and therefore bolted connections 2010 (and the through-bores defined through platform 1100 to receive bolts 2014) can be identical for first and second vehicles 10, 20, 100. As a result, a user can remove bolts 2014 to release one kind of rack 2000 (e.g., second rack 2000*b*) from base 1000, then replace the released rack with a different rack 2000 (e.g., first rack 2000*a*).

Bolted connections 2010 can transfer the complete load of rack assembly 2000 and containers 450 to base 1000. Therefore, and according to some embodiments, rack 2000 only directly contacts base 1000 through bolted connections 2010. Rack 2000 can be fastened to base 1000 through other mechanisms (e.g., via welding). According to some embodiments, and as shown in FIG. 2, a plurality of beams 2010, 2200, 2300 (e.g., five in FIG. 2) can lie flush against, and in direct contact with, platform upper surface 1102.

Referring to FIG. 10, opposing transverse ends of each elevated transverse beam 2200 can be secured to vehicle rails 2400 via first braces 2500, 2500*a*. Referring to FIG. 2, the transverse midpoint of each elevated transverse beam 200 can be secured to a vehicle rail 2400 via a second brace 2500, 2500*b*.

FIG. 9 is a zoomed and partial view of first vehicle 10, 100 including first brace 2500, 2500*a*. First brace 2500*a* can include a pair of L-plates 2502 connected via a bridge plate 2504. First brace 2500*a* can define three-sides of a box-shaped thru-hole 2506 for capturing and confining a transverse beam 2200. As shown in FIG. 12, thru-hole 2506 can have a square-shaped cross-section with sharp corners. In contrast, the outer periphery of transverse beam 2200 can include filleted edges 2210 (FIG. 12) such that four small transversely extending seams 2510 are unoccupied when thru-hole 2506 captures transverse beam 2200 (FIG. 12). Welding material (not shown) can be deposited within seams 2510 to enhance the bond between transverse beam 2200 and first brace 2500*a* and to enhance the bond between transverse beam 2200 and vehicle rail 2400.

Referring to FIGS. 11 and 12, each first end brace 2500 can flushly and directly contact the upper surface 2402 of vehicle rail 2400 via L-plates 2502. Each first end brace 2500, 2500*a* can compress the lower surface of transverse beam 2200 into direct flush contact with vehicle rail upper surface 2402. First brace 2500*a* can be welded to both transverse beam 2200 and vehicle rail 2400. Alternatively, or in addition, bolts can affix first brace 2500*a* to transverse beam 2200 and/or vehicle rail 2400.

FIGS. 2, 5, and 19-21 illustrate second braces 2500, 2500*b*, which can bind vehicle rails 2400 to the intersections 2060 between transverse beams 2200 and longitudinal beams 2300. Referring to FIG. 21, second brace 2500*b* can have the same structure as first brace 25*a*, except with one of the L-plates 2502 omitted. As shown in FIG. 21, bridge 2504 can extend to partially cover and flushly contact an upper surface 2302 of longitudinal beam 2300. Welding material (not shown) can be deposited in the transversely extending seams 2510 defined between transverse beam 2200 and second brace 2500*b*. Second brace 2500*b* can be welded or otherwise directly secured (e.g., bolted) to both vehicle rail 2400, transverse beam 2200, and longitudinal beam 2300.

Referring to FIGS. 7, 8, and 9, a container 450 (also called a container assembly) can include a vessel 460 (also called a receptacle, a container body, a folder, a bin) and a connection assembly 470 (also called a coupling portion). Vessel 460 can define a chamber 462 for storing items 30 (see FIG. 9). As shown in FIGS. 7 and 9, chamber 462 can be open the transverse sides of vessel 460. The remaining sides of vessel 460 can be sealed shut.

Connection assembly 470 can be for suspending container 450 from rails 2400. Connection assembly 470 can include a plurality of wheels 472 (e.g., roller bearings) for rolling within channels defined in vehicle rails 2400 (see FIG. 9) and system rails 410. The complete load of container 450 can be transmitted to vehicle 100 via wheels 472.

Part 4

Referring to FIGS. 11-14, vehicle rails 2400 can include a main portion 2420 an end coupling 2440. As shown in FIGS. 1 and 2, vehicle rails 2400 can include dual opposing end couplings 2440. Main portion 2420 can be formed from a unitary and integral piece of material (e.g., metal). Main portion 2420 can be stiff (i.e., inflexible). By contrast, end couplings 2440 can be flexible (i.e., bendable). End couplings 2440 can be configured to connect (i.e., couple) rack 2000 with rail system 400. End couplings 2440 can include a polymeric material to enhance flexibility. End couplings 2440 can consist of polymeric material.

Referring to FIGS. 13 and 14, main portion 2420 can define a transversely disposed and longitudinally extending first channel 2422, an opposing transversely disposed and longitudinally extending second channel 2424, and a vertically disposed and longitudinally extending third channel 2426. Channels are also called tracks or slots. A pair of container wheels 472 can be disposed in each of the main channels 2422, 2424, 2426. FIG. 9 shows a pair of container wheels 472 being disposed in first main channel 2422.

Referring to FIGS. 11-15, end coupling 2440 can include a plate assembly 2450 and an end fitting 2470. Plate assembly 2450 can be for enabling flex (i.e., bending) in the longitudinal ends of vehicle rail 2400. End fitting 2470 can be for joining and aligning one vehicle rail 2400 with an end 414 of a system rail 414 (discussed above with reference to FIG. 4).

Vehicle rails 2400 are discussed with reference to FIGS. 13-24. Hatching (e.g., stippling) indicates inner material. Referring to FIGS. 15 and 21, plate assembly 2450 can include a flexible spine 2452 longitudinally extending through a plurality of spaced apart plates 2460. Spine 2452 can be made of a resilient elastomer (e.g., rubber). Plates 2460 can be made from metal. Plates 2460 can be made from resilient elastomer (e.g., rubber). Fitting 2470 can be made from resilient elastomer (e.g., rubber).

Referring to FIG. 17, each plate 2460 can define a transversely disposed and longitudinally extending first channel 2462, an opposing transversely disposed and longitudinally extending second channel 2464, and a vertically disposed and longitudinally extending third channel 2466. Plates 2460 can be aligned such that each plate first, second, and third channel 2462, 2464, 2466 of each plate 2460 is respectively aligned. Plates 2460 can be aligned such that each plate first, second, and third channel 2462, 2464, 2466 is respectively aligned with a main channel 2422, 2424, 2426. As shown in FIG. 17, each plate can define a central aperture through with spine 2452 extends.

Referring to FIGS. 13 and 14, end fitting 2470 can include a discrete upper section 2472, and a pair of discrete lower sections 2474. As shown in FIG. 13, a longitudinally inward portion 2478 of end fitting 2470 can be occupied by plates 2460 while a longitudinally outward portion 2480 of end fitting 2470 can be unoccupied. One or more transverse bolts (not shown) can secure end fitting 2470 to one or more plates 2460. Alternatively, end fitting 2470 can be welded to one or more plates 2460. According to some embodiments, end fitting 2470 is only directly affixed (e.g., via the bolts or welding) to one plate 2460 (e.g., plate 2460a in FIG. 14).

Longitudinally inward portion 2478 of end fitting 2470 can snugly fit about plates 2460 as shown in FIG. 17. As previously discussed, system rails 410 can have the same structure as vehicle rail main portion 2420. Vehicle rail main portion 2420 can have the same cross-sectional profile as plates 2460.

FIG. 23 shows vehicle rail 2400 being at least partially coupled to system rail 410. FIG. 24 is a cross-sectional view from plane 24-24 in FIG. 23. As shown in FIG. 24, end fitting 2470 can receive system rail 410 in an identical manner to how end fitting 2470 receives plates 2460. End fitting 2470 can thus guide system rail 410 into flush direct contact with the leading vehicle plate 2460, 2460b (FIG. 23).

Spine 2452 can be made from a resilient elastomer (e.g., rubber). Spine 2452 can be biased to the aligned state shown in FIGS. 15 and 21 where the complete central axis of spine 2452 is parallel to the longitudinal. As shown in FIG. 21, spine 2452 can extend into main portion 2420. As shown in FIG. 22, spine 2452 can be flexible in the transverse, vertical, and/or longitudinal directions to enable end coupling 2440 to occupy a plurality of different flexed states. When in a flexed state (e.g., FIG. 22), spine 2452 can be biased back toward the aligned state.

According to other embodiments, spine 2452 can be biased to the upwardly flexed state shown in FIG. 22. Therefore, when end coupling 2440 is in a disconnected (i.e., decoupled state), spine 2452 can cause end coupling 2440 to assume the upwardly flexed state shown in FIG. 22. This state can discourage containers 450 from falling off vehicle 100 while in transit. Although FIG. 22 shows spine 2452 flexing at a discrete elbow, spine 2452 can naturally continuously upwardly flex (i.e., gradually and continuously arc) as shown in FIGS. 31A and 31B (discussed below).

According to some embodiments (see FIG. 26), spine 2452 can be composed of a plurality of discrete segments extending between, but not through, consecutive plates 2460. Spine 2452 can be hollow and house electrical and/or mechanical components (e.g., an electromagnet, wires for sensors, hydraulics, etc.).

According to some embodiments, spine 2452 can be longitudinally compressible (e.g., spine 2452 can be a plurality of longitudinally compressible pads, as shown in FIG. 26 or spine 2452 can be made of a longitudinally extending coiled spring). FIG. 21 can represent an unbiased state of spine 2452 where aligned plates 2460 are spaced apart. Thus, FIG. 23 can represent an intermediate stage of coupling where system rail end 414 is in direct flush contact with leading plate 2460b, but before system rail 410 begins to compress spine 2452 by virtue of force transmitted through the direct flush contact between system rail 410 and leading plate 2460b.

FIG. 25 can represent a final coupling state where system rail 410 has compressed plates 2460 close together (i.e., vehicle rail end coupling 2440, excluding fitting 2470, is squeezed together between vehicle rail main portion 2420 and system rail 410). In this state, plates 2460 can each be in direct flush contact (i.e., the gaps between plates 2460 are eliminated as shown in FIG. 25) or at least spaced apart to a lesser degree.

In an uncoupled state, plates 2460 can be spaced apart such that container wheels 472 can freely traverse end coupling channels 2462, 2464, 2466 to/from main channels 2422, 2424, 2426 and from/to the same channels defined in system rails 410. Alternatively, and in the uncoupled state, plates 2460 can be spaced apart such that container wheels 472 cannot freely traverse end coupling channels 2462, 2464, 2466 when end coupling 2440 is in the unbiased state of FIG. 21 and FIG. 23 (e.g., container wheels 472 will stop against the transverse edges of plates 2460). According to these embodiments, container wheels 472 may only be capable of traversing end coupling channels 2462, 2464, 2466 when end coupling 2440 is in the compressed state shown in FIG. 25 (i.e., plates 2460 are squeezed together).

As shown in FIGS. 13 and 14, end fitting 2470 can have a uniform profile across its longitudinal axis. However, and as shown in FIG. 27, at least longitudinally outward portion 2480 can be funnel shaped (i.e., gradually expanded in the transverse and/or vertical directions) along the longitudinal axis to enhance the ability of end fitting 2470 to capture a system rail end 414. FIG. 28 is a front elevational cross-sectional view from plane 28-28 in FIG. 27 and illustrates the expansion of outward portion 2480 along the longitudinal axis.

Part 5

FIG. 29 is a block diagram of a method 2900 for coupling vehicle 100 with rail system 400. PS 300 can be configured to perform method 2900. At block 2902, PS 300 receive a desired system rail end 414 (FIG. 4) for coupling with vehicle 100. At block 2904, PS 300 can move vehicle 100 to a position near the desired rail end 414. PS 300 can stop vehicle 100 once vehicle 100 is sufficiently close to desired rail end 414 for sensors of PS 300 to capture rail end 414.

At block 2908, PS 300 can map the desired rail end 414 (e.g., via one or more LiDAR sensors, via one or more image sensors, etc.). At block 2910, PS 300 can determine (e.g., estimate) a vector 3002 (see FIG. 30) normal to the face of the desired rail end. At block 2912, PS 300 can reposition vehicle 100 to align the central longitudinal axis of end fitting 2470 with vector 3002 (e.g., make the central longitudinal of end fitting 2470 collinear with vector 3002). PS 300 can iterate blocks 2908-2912 until sufficient alignment is achieved (i.e., a misalignment degree is less than a predetermined amount). According to some embodiments, PS 300 actuates hydraulics system 1600 to align the central longitudinal axis of end fitting 2470 with vector 3002. According to some embodiments, PS 300 actuates hydraulics system 1600 to position leading plate 2460b at the same vertical height as rail end 414.

At block 2914, PS 300 can cause vehicle 100 to approach along vector 3002 (e.g., move longitudinally parallel to vector 3002) until end fitting 2470 at least partially captures rail end 414 (e.g., until a predetermined longitudinal length of end fitting 2470, such as 3 cm, is disposed directly about rail end 414). If vector 3002 defines an angle with respect to the longitudinal, then the approach of vehicle 100 can simultaneously include movement of wheels 1204 and raising/lowering (e.g., tilting) via hydraulics system(s) 1600. At block 2916, PS 300 can determine a desired final position (e.g., heading) of vehicle 100. Because end coupling 2440 can be transversely and/or vertically flexible, the final heading of vehicle 100 can be non-parallel with vector 3002.

At block 2918, PS 300 can advance toward rail end 414 based on the desired final position of vehicle 100. The movement can induce transverse and/or vertical flex in end coupling 2440. PS 300 can continue to move toward rail end 414 until a sufficient degree of compression of end coupling 2440 is achieved. Block 2918 can include a sequence of movements (including backwards movements and/or pivots)

such that the desired final position of vehicle 100 and the desired compression degree of end coupling 2440 are simultaneously achieved.

At block 2920, PS 300 can actuate hydraulics system 1600 to either tip rack 2000 toward rail end 414 (and thus deliver containers 450 to rail system 410) or tip rack 2000 away from rail end 414 (and thus receive containers 450 from rail system 410).

When tipping toward rail end 414, PS 300 can actuate hydraulics system 1600 such that each point of vehicle rail 2400 (with the possible exception of leading plate 2460b) is sloped with respect to vertical. As shown schematically in FIG. 31A, each point of vehicle rail 2400 (with the possible exception of leading plate 2460b) is sloped with respect to vertical such that leading plate 2460b is the lowest point along vehicle rail 2400 (e.g., such that leading plate 2460b defines both the absolute vertical minimum along rail 2400 and the only local minimum along rail 2400).

PS 300 can perform the opposite operation when tipping rack 2000 away from rail end 414. As shown schematically in FIG. 31B, each point of vehicle rail 2400 (with the possible exception of leading plate 2460b) is sloped with respect to vertical such that leading plate 2460b is the highest point along vehicle rail 2400 (e.g., such that leading plate 2460b defines both the absolute vertical maximum along rail 2400 and the only local maximum along rail 2400).

Part 6

Referring to FIG. 3, vehicle 100 can include a processing system 300. Processing system 300 can include one or more processors 301, memory 302, one or more input/output devices 303, one or more sensors 304, one or more user interfaces 305, and one or more actuators 306.

Processors 301 can include one or more distinct processors, each having one or more cores. Each of the distinct processors can have the same or different structure. Processors 301 can include one or more central processing units (CPUs), one or more graphics processing units (GPUs), circuitry (e.g., application specific integrated circuits (ASICs)), digital signal processors (DSPs), and the like. Processors 301 can be mounted on a common substrate or to different substrates.

Processors 301 are configured to perform a certain function, method, or operation at least when one of the one or more of the distinct processors is capable of executing code, stored on memory 302 embodying the function, method, or operation. Processors 301 can be configured to perform any and all functions, methods, and operations disclosed herein.

For example, when the present disclosure states that processing 300 performs/can perform task "X" (e.g., task "X is performed"), such a statement should be understood to disclose that processing system 300 can be configured to perform task "X". Vehicle 100 and processing system 300 are configured to perform a function, method, or operation at least when processors 301 are configured to do the same. As used herein the term "determine", when used in conjunction with processing system 300 can mean detecting, receiving, looking-up, computing, and the like.

Memory 302 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 302 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 302.

Input-output devices 303 can include any component for trafficking data such as ports, antennas (i.e., transceivers), printed conductive paths, and the like. Input-output devices 303 can enable wired communication via USB®, DisplayPort®, HDMI®, Ethernet, and the like. Input-output devices 303 can enable electronic, optical, magnetic, and holographic, communication with suitable memory 303. Input-output devices can enable wireless communication via WiFi®, Bluetooth®, cellular (e.g., LTE®, CDMA®, GSM®, WiMax®, NFC®), GPS, and the like. Input-output devices 303 can include wired and/or wireless communication pathways.

Sensors 304 can capture physical measurements of environment and report the same to processors 301. Examples of sensors 304 include temperature sensors, image sensors, LiDAR sensors, etc. User interface 305 can include a display (e.g., LED touchscreens (e.g., OLED touchscreens), physical buttons, speakers, microphones, keyboards, and the like. Actuators 306 can enable processors 301 to control mechanical forces. Actuators 306 can include motors, hydraulics, etc.

Processing system 300 can be distributed (e.g., primary non-volatile memory can be disposed in a first remote server and the other modules can be disposed in a second remote server). Processing system 300 can have a modular design where certain modules have a plurality of the features shown in FIG. 3. For example, one module can include one or more processors 301, memory 302, I/O 303, and sensors 304.

We claim:

1. A vehicle for transporting containers, the vehicle comprising:
    a base comprising:
       a platform;
       a plurality of wheels; and
       a motor for driving one or more of the plurality of wheels;
    a rack mounted to the platform, the rack comprising at least one rail, the at least one rail comprising a channel defined therein and comprising an end coupling for linking the at least one rail with an external rail;
    at least one container configured to connect with the at least one rail, the at least one container comprising a connection assembly, at least a portion of the connection assembly being moveably disposed in the channel; and
    a processing system comprising one or more processors configured to:
       receive a request to link the at least one rail with the external rail;
       drive the motor to align the end coupling with the external rail; and
       based on determining that the end coupling is aligned with the external rail, drive the motor to link the end coupling with the external rail such that the at least one container is moveable, along the channel, from the at least one rail to the external rail.

2. The vehicle of claim 1 further comprising an outer bumper longitudinally projecting from the platform.

3. The vehicle of claim 2 wherein said outer bumper is moveable between a first extended position and a second retracted position.

4. The vehicle of claim 3 wherein the outer bumper in the first extended position extends longitudinally further from the platform than the at least one rail.

5. The vehicle of claim 1 wherein the at least one rail comprises a pair of opposing end couplings, and wherein the one or more processors are configured to align a first of said pair of opposing end couplings with the external rail and align a second of said pair of opposing end couplings with the external rail.

6. The vehicle of claim 5 wherein the one or more processors are configured to align a first of said pair of opposing end couplings with the external rail simultaneous with the alignment of a second of said pair of opposing end couplings with the external rail.

7. The vehicle of claim 1 wherein said at least the portion of the connection assembly comprises a roller bearing.

8. The vehicle of claim 1 wherein said end coupling is flexible.

9. The vehicle of claim 1 wherein said end coupling comprises a flexible spline extending through a plurality of spaced apart plates.

10. The vehicle of claim 1 further comprising an undercarriage plate, wherein said motor is disposed between said platform and said undercarriage plate.

11. A vehicle for transporting containers, the vehicle comprising:
a base comprising: a plurality of wheels and a motor for driving one or more of the plurality of wheels;
a rack mounted to the base, the rack comprising at least one rail, the at least one rail comprising a channel defined therein and comprising an end coupling for linking the at least one rail with an external rail;
at least one container configured to connect with the at least one rail, the at least one container comprising a connection assembly, at least a portion of the connection assembly being moveably disposed in the channel; and
a lift system configured to tilt said rack relative to a vertical axis.

12. The vehicle of claim 11 wherein said lift system tilts said rack in a manner to encourage movement of containers from the rack to the external rail.

13. The vehicle of claim 11 wherein said lift system tilts said rack in a manner to encourage movement of containers from the external rail to said rack.

14. The vehicle of claim 11 further comprising a processing system comprising one or more processors configured to position said lift system to tilt said rack in a manner to encourage movement of containers from the rack to the external rail.

15. The vehicle of claim 11 further comprising:
a processing system comprising one or more processors configured to:
receive a request to link the at least one rail with the external rail;
drive the motor to align the end coupling with the external rail; and
based on determining that the end coupling is aligned with the external rail, drive the motor to link the end coupling with the external rail such that the at least one container is moveable, along the channel, from the at least one rail to the external rail.

16. The vehicle of claim 11 wherein said end coupling comprises a flexible spline extending through a plurality of spaced apart plates.

17. A method of transferring containers from a vehicle to an external rail, the method comprising:
positioning a vehicle adjacent an external rail, the vehicle comprising a base having a plurality of motor-controlled wheels and at least one vehicle rail mounted to said base, the vehicle rail comprising a main portion and an end coupling, and having a plurality of containers slidably coupled to the at least one vehicle rail;
aligning the end coupling with the external rail; and
while the end coupling is aligned with the external rail, transferring one or more of the plurality of containers to said external rail along the main portion of the at least one vehicle rail.

18. The method of claim 17 wherein said vehicle further comprises one or more processors configured to execute the steps of claim 17.

19. The method of claim 17 wherein the vehicle further comprises a lift system, the method further comprising:
positioning said lift system to tilt the at least one vehicle rail relative to a vertical axis in a manner to encourage movement of the one or more of the plurality of containers from the at least one vehicle rail to the external rail.

20. The method of claim 19 wherein the step of positioning said lift system comprises actuating a hydraulic actuator.

* * * * *